United States Patent
Rawte et al.

(10) Patent No.: US 11,642,953 B2
(45) Date of Patent: May 9, 2023

(54) MOUNTING ARRANGEMENT FOR A POWERTRAIN OF A FOUR-WHEELED VEHICLE

(71) Applicant: MAHINDRA AND MAHINDRA LIMITED, Mumbai (IN)

(72) Inventors: Samir Ramesh Rawte, Mumbai (IN); Radhakrishnan Janakiraman, Chennai (IN); Christopher Nelander, Auburn Hills, MI (US); Karl Plattenberger, Auburn Hills, MI (US); Keith Takasawa, Auburn Hills, MI (US); Richard Paul Haas, Dearborn, MI (US)

(73) Assignee: MAHINDRA AND MAHINDRA LIMITED, Maharashtra (IN)

( * ) Notice: Subject to any disclaimer, the term of this patent is extended or adjusted under 35 U.S.C. 154(b) by 71 days.

(21) Appl. No.: 16/951,418

(22) Filed: Nov. 18, 2020

(65) Prior Publication Data

US 2021/0197654 A1 Jul. 1, 2021

Related U.S. Application Data

(63) Continuation-in-part of application No. 15/121,000, filed as application No. PCT/IB2015/051360 on Feb. 24, 2015, now abandoned.

(30) Foreign Application Priority Data

Feb. 24, 2014 (IN) .......................... 636/MUM/2014

(51) Int. Cl.
*B60K 5/04* (2006.01)
*B60K 1/00* (2006.01)

(Continued)

(52) U.S. Cl.
CPC .................. *B60K 5/04* (2013.01); *B60K 1/00* (2013.01); *B60K 17/08* (2013.01); *B60K 17/24* (2013.01);

(Continued)

(58) Field of Classification Search
CPC .......... B60K 5/04; B60K 17/08; B60K 17/24; B60K 17/30; B60K 17/344
See application file for complete search history.

(56) References Cited

U.S. PATENT DOCUMENTS 4,240,517 A * 12/1980 Harlow, Jr. .......... B60G 99/004
248/605
4,403,676 A * 9/1983 Fujii ..................... F16H 57/037
180/297

(Continued)

*Primary Examiner* — Frank B Vanaman
(74) *Attorney, Agent, or Firm* — Lathrop GPM LLP; William T. Griffith

(57) ABSTRACT

An arrangement for mounting a powertrain of a four-wheeled vehicle of a body-on-frame type, wherein the powertrain is mounted on a chassis in an orientation transverse to the longitudinal axis of the vehicle. The mounting arrangement comprises a right-side powertrain mounting assembly 310 for supporting the powertrain 100 on the right-hand side, a left-side powertrain mounting assembly 320 for supporting the powertrain 100 on the left-hand side of the vehicle, and a powertrain roll-restricting and mounting assembly 330 for supporting the powertrain 100 on the rear side of the powertrain 100. The right-side powertrain mounting assembly 310 and the left-side powertrain mounting assembly 320 comprise a right isolating element 316 and a left isolating element 326 respectively, and the powertrain roll-restricting and mounting assembly 330 comprises a roll restricting and isolating element 334.

17 Claims, 23 Drawing Sheets

(51) Int. Cl.
*B60K 17/344* (2006.01)
*B60K 17/08* (2006.01)
*B60K 17/24* (2006.01)
*B60K 17/30* (2006.01)
*B60K 17/356* (2006.01)

(52) U.S. Cl.
CPC ............ *B60K 17/30* (2013.01); *B60K 17/344* (2013.01); *B60K 17/356* (2013.01); *B60K 2001/001* (2013.01)

(56) References Cited

U.S. PATENT DOCUMENTS

| | | | | |
|---|---|---|---|---|
| 4,560,027 | A * | 12/1985 | Murakami | B60K 5/04 180/312 |
| 4,564,082 | A * | 1/1986 | Takehara | B60K 5/1241 180/312 |
| 2004/0045761 | A1 * | 3/2004 | Miyahara | F16F 1/373 180/292 |
| 2007/0199742 | A1 * | 8/2007 | Miyahara | B60K 5/04 180/374 |
| 2010/0032542 | A1 * | 2/2010 | Heitkamp | B60K 17/24 248/548 |
| 2012/0090912 | A1 * | 4/2012 | Gannon | B60K 5/1216 180/312 |

* cited by examiner

MOUNTING ARRANGEMENT FOR A POWERTRAIN OF A FOUR-WHEELED VEHICLE

CROSS REFERENCE TO RELATED APPLICATIONS

This application is a continuation-in-part application of U.S. patent application Ser. No. 15/121,000 filed on Aug. 23, 2016 wherein that application is a national stage application of PCT/IB2015/051360 filed on Feb. 24, 2015 wherein that application claims priority to IN636/MUM/2014 filed on Feb. 24, 2014, the disclosures of all of these applications are hereby incorporated herein by reference in their entirety.

FIELD

The present disclosure relates to an arrangement for mounting a powertrain in a vehicle.

Definition

Torque roll axis of an engine: In automotive engines, the torque excitation occurs about an axis which is not parallel to any of the principal axes of the engine. A resultant roll movement of the engine occurs about an axis, known as the torque roll axis. The most suitable locations of engine mountings are, therefore, along the torque roll axis.

BACKGROUND

A majority of vehicles are rear wheel drive vehicles, wherein an engine drives rear wheels of the vehicle. More specifically, the rear wheels are driven by the engine, particularly, the engine is coupled with a transmission which in turn is connected to a differential via a propeller shaft. The differential is mounted on a rear axle supporting the rear wheels. The engine, particularly the internal combustion (IC) engine rotates the propeller shaft and consequently rotating the rear axle through the differential. Conventionally, in a vehicle, the engine is mounted longitudinally with respect to a frame of the vehicle. Generally, for a rear wheel drive vehicle, the engine is mounted in the front portion of the vehicle.

The front engine, rear wheel driven power train package is predominantly used in vehicles having "body on frame" configuration of the vehicle. Further front engine front wheel drive is used in vehicles having monocoque construction, particularly, "body frame integrated" construction. With front engine, front wheel drive configuration of the vehicle, the requirement of propeller shaft, rear axle and differential is eliminated, and hence, drivetrain efficiency would be enhanced. The "body on frame" configuration of the vehicle has its own advantages.

For a front wheel drive configuration to be implemented with a transversely mounted powertrain, a higher number of moving components in the compact space would require an arrangement with enhanced vibration-absorbing capability. Also, the larger lateral expanse of the powertrain on the chassis with the same width would present new challenges for assembly, which may possibly need a new set of equipment for powertrain assembly, thereby raising the overall vehicle manufacturing cost.

There is thus felt a need for eliminating the problems/limitations associated with prior arrangement for packaging the engine of automobiles, particularly, there is felt a need for an arrangement for packaging an engine of an automobile, wherein the engine is disposed at the front portion of the vehicle having "body on frame" configuration, and utilizing advantages associated with the "body on frame" configuration of the vehicle. Also, there is a need of an arrangement for mounting a powertrain on the front portion of the chassis of a vehicle having "body on frame" configuration.

Objects

Some of the objects of the present disclosure, which at least one embodiment herein satisfies, are as follows:

A primary object of the present disclosure is to provide an arrangement for mounting a powertrain of a four-wheeled body-on-frame-type vehicle for a configuration with a transversely mounted powertrain.

Another object of the present disclosure is to provide an arrangement for mounting a powertrain in a front portion of the chassis of the vehicle.

Yet another object of the present disclosure is to provide an arrangement for mounting a powertrain that facilitates ease of assembly of the powertrain on the chassis.

Still another object of the present disclosure is to provide an arrangement for mounting a powertrain that facilitates assembling the powertrain on the chassis using an existing set of equipment.

Still another object of the present disclosure is to provide an arrangement for mounting a powertrain on a chassis frame, with a good vibration-absorbing capacity.

Other objects and advantages of the present disclosure will be more apparent from the following description, which is not intended to limit the scope of the present disclosure.

SUMMARY

The present disclosure envisages arrangement for mounting a powertrain of a four-wheeled vehicle. The powertrain is mounted on a chassis in an orientation transverse to the longitudinal axis of the vehicle defined by the chassis.

The mounting arrangement comprises a right-side powertrain mounting assembly for supporting the powertrain on the right-hand side with respect to the operative front of the vehicle, a left-side powertrain mounting assembly for supporting the powertrain on the left-hand side with respect to the operative front of the vehicle, and a powertrain roll-restricting and mounting assembly for supporting the powertrain on the rear side of the powertrain.

The right-side powertrain mounting assembly comprises at least one right chassis-side bracket, a right powertrain-side bracket and a right isolating element. The right chassis-side bracket is configured to be fixed on the right-hand side long member of the chassis. The right powertrain-side bracket is configured to be fixed on a predetermined location on the operative right-side of the powertrain. The right isolating element is configured to be fitted between the right chassis-side bracket and the right powertrain-side bracket. The right-side powertrain mounting assembly includes at least one first fastener to secure the right chassis-side bracket and the right isolating element with respect to each other, and at least one second fastener to secure the right isolating element and the right powertrain-side bracket with respect to each other. In an embodiment, the right-side powertrain mounting assembly includes two right chassis-side brackets.

The left-side powertrain mounting assembly comprises at least one left chassis-side bracket, a left powertrain-side bracket and a left isolating element. The left chassis-side bracket is configured to be fixed on the chassis. The left powertrain-side bracket is configured to be fixed on a predetermined location on the operative left-side of the powertrain. The left isolating element is configured to be fitted between the left chassis-side bracket and the left powertrain-side bracket. The right-side powertrain mounting assembly includes at least one third fastener to secure the left chassis-side bracket and the left isolating element with respect to each other, and at least one fourth fastener to secure the left isolating element and the left powertrain-side bracket with respect to each other. In an embodiment, the left-side powertrain mounting assembly comprises two left chassis-side brackets that include a first left chassis-side bracket and a second left chassis-side bracket, wherein the first left chassis-side bracket is configured to be welded to the chassis and the second left chassis-side bracket is configured to be fastened to the chassis using eight fasteners.

The powertrain roll-restricting and mounting assembly comprises a rear powertrain-side bracket and a roll restricting and isolating element. The rear powertrain-side bracket is configured to be fixed on a predetermined location on the operative rear-side of the powertrain. The roll restricting and isolating element is configured to attach the rear powertrain-side bracket at a predetermined location on the cross member of the chassis. The powertrain roll-restricting and mounting assembly includes at least one fifth fastener configured to secure the third chassis-side bracket and the roll isolating element with respect to each other.

Typically, the fasteners used in the assemblies are bolts.

According to an aspect of the present disclosure, the right-side powertrain mounting assembly is configured to be located on the torque roll axis of the powertrain, the left-side powertrain mounting assembly is configured to be located on the torque roll axis of the powertrain, the powertrain roll-restricting and mounting assembly is configured to be located below the torque roll axis of the powertrain.

According to another aspect of the present disclosure, the right powertrain-side bracket is configured to be located above the right chassis-side bracket, whereas the left powertrain-side bracket is configured to be located below the left chassis-side bracket. In an embodiment, the right powertrain-side bracket is configured to be fixed on the engine portion and the left powertrain-side bracket is configured to be fixed on the transaxle portion of the powertrain. In a preferred embodiment, the right chassis-side bracket is configured to be fitted adjacent to a right-hand side suspension-supporting column by means of welding, wherein the right-hand side suspension-supporting column is provided on the right-hand side long member of the chassis. On the other hand, the left chassis-side bracket is configured to be fitted on a left-hand side suspension-supporting column by means of further fasteners, wherein left-hand side suspension-supporting column is provided on the left-hand side long member of the chassis.

In an embodiment, the right-side powertrain mounting assembly is closer to the operative front end of the vehicle than said left-side powertrain mounting assembly.

In an embodiment, the right isolating element comprises a first outer rigid element and a first inner rigid element and a first resilient element sandwiched between the first outer rigid element and the first inner rigid element. Similarly, the left isolating element comprises a second outer rigid element and a second inner rigid element and a second resilient element sandwiched between the second outer rigid element and second first inner rigid element.

In an embodiment, the roll restricting and isolating element comprises a bushing, a third resilient element and a link rod disposed between the bushing and the third resilient element. The bushing is configured to be coupled to the rear powertrain-side bracket. The third resilient element is adapted to be coupled to the cross member of the chassis.

Preferably, the right powertrain-side bracket is a forged bracket. The left powertrain-side bracket is a cast bracket. The right chassis-side bracket and the left chassis-side bracket are formed sheet metal brackets. The rear powertrain-side bracket is a formed sheet metal bracket. In an embodiment, the roll restricting and isolating element is a casted component.

In an embodiment, the vehicle is a front wheel drive vehicle.

Also envisaged is a method of mounting a powertrain on a chassis of a vehicle with the mounting arrangement as described above. The preferred method involves carrying out the right-side powertrain mounting assembly followed by the powertrain roll-restricting and mounting assembly and finally the left-side powertrain mounting assembly. Another aspect of the method is that the assembly starts with two brackets being fixed to the powertrain and one bracket being fixed to the chassis. The method comprises the steps of:

i. pre-assembling the right powertrain-side bracket, the left powertrain-side bracket and the rear powertrain-side bracket and the roll restricting and isolating element on the powertrain;
ii. fixing the right chassis-side bracket to the chassis;
iii. fixing the first left chassis-side bracket to the chassis;
iv. fixing the first resilient mount to the right chassis-side bracket;
v. decking the engine from above while aligning the right powertrain-side bracket with the first resilient mount to complete the right-side powertrain mounting assembly;
vi. fixing the right powertrain-side bracket with the first resilient mount;
vii. fixing the roll restricting and isolating element to a cross member to complete the powertrain roll-restricting and mounting assembly;
viii. fixing the second left chassis-side bracket to at least one of the chassis and the first left chassis-side bracket;
ix. fixing the left isolating element to the second left chassis-side bracket to complete the left-side powertrain mounting assembly.

Preferably, the step of fixing the right chassis-side bracket to the chassis involves welding the right chassis-side bracket to the chassis. The step of fixing the second left chassis-side bracket to at least one of the first left chassis-side bracket and the chassis involves fastening the second left chassis-side bracket to the first left chassis-side bracket and to the chassis using threaded fasteners.

BRIEF DESCRIPTION OF THE ACCOMPANYING DRAWING

An arrangement for mounting a powertrain of a four-wheeled vehicle, of the present disclosure, will now be described with the help of the accompanying drawing, in which.

Figure 1A:
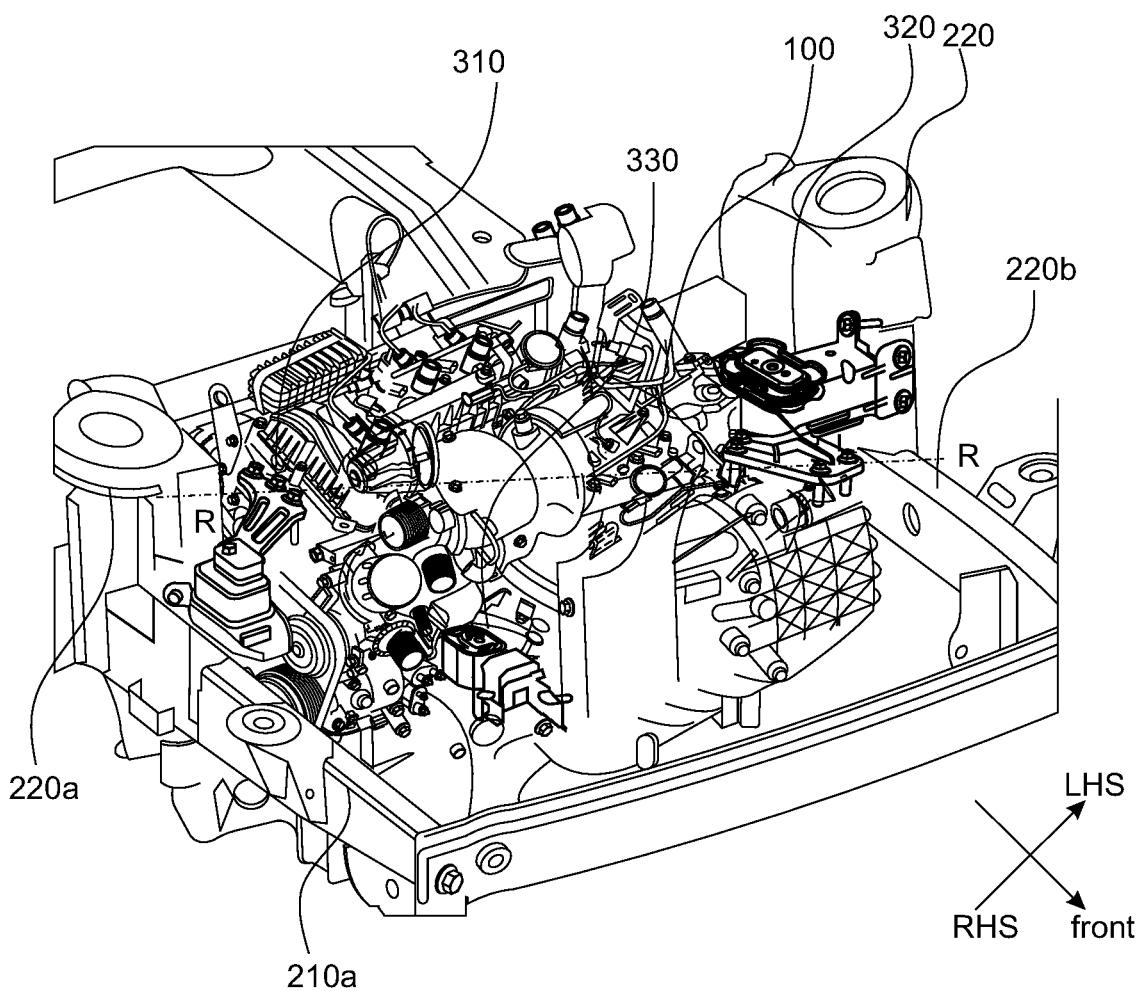
FIG. 1A illustrates an isometric view of powertrain mounting arrangement of the present disclosure.

LIST OF REFERENCE NUMERALS powertrain 100; torque roll axis of the powertrain R-R; chassis 200; right-hand side long member 210 a; left-hand side long member 210 b; cross member 215; right-hand side suspension-supporting column 220 a; left-hand side suspension-supporting column 220 b; right-side powertrain mounting assembly 310; right chassis-side brackets 312 a, 312 b; right powertrain-side bracket 314; right isolating element 316; left-side powertrain mounting assembly 320; left chassis-side brackets 322 a, 322 b; left powertrain-side bracket 324; left isolating element 326; powertrain roll-restricting and mounting assembly 330; rear powertrain-side bracket 332; roll restricting and isolating element 334; bushing 3341; third resilient element 3342; link rod 3343; first fastener 400 a; second fastener 400 b; third fastener 400 c; fourth fastener 400 d; fifth fastener 400 e; sixth fastener 400 f; seventh fastener 400 g; further fastener 400 h; ninth fastener 400 i; tenth fastener 400 j.

DETAILED DESCRIPTION

Embodiments, of the present disclosure, will now be described with reference to the accompanying drawing.

Embodiments are provided so as to thoroughly and fully convey the scope of the present disclosure to the person skilled in the art. Numerous details are set forth, relating to specific components, and methods, to provide a complete understanding of embodiments of the present disclosure. It will be apparent to the person skilled in the art that the details provided in the embodiments should not be construed to limit the scope of the present disclosure. In some embodiments, well-known processes, well-known apparatus structures, and well-known techniques are not described in detail.

The terminology used, in the present disclosure, is only for the purpose of explaining a particular embodiment and such terminology shall not be considered to limit the scope of the present disclosure. As used in the present disclosure, the forms "a", "an" and "the" may be intended to include the plural forms as well, unless the context clearly suggests otherwise. The terms "comprises", "comprising", "including" and "having" are open ended transitional phrases and therefore specify the presence of stated features, elements, modules, units and/or components, but do not forbid the presence or addition of one or more other features, elements, components, and/or groups thereof.

The terms first, second, third, etc., should not be construed to limit the scope of the present disclosure as the aforementioned terms may be only used to distinguish one element, component or section from another component or section. Terms such as first, second, third etc., when used herein do not imply a specific sequence or order unless clearly suggested by the present disclosure.

A conventional powertrain mounting on a body-on-frame vehicle chassis involves three mounts which are pre-assembled onto the powertrain. The powertrain is mounted on top of the chassis by lowering from above and is fastened with three mounts which are pre-assembled in the chassis. However, the same mounting configuration is not a viable option for mounting the engine transversely. The difficulty is in the geometry of the conventional vehicle chassis which does not allow the same type of mounts and the assembly process for packaging the powertrain along a transverse axis of the vehicle. Hence, there is felt a need for a mounting configuration which enables ease of assembly of the engine transversely onto the body-on-frame vehicle.

The present disclosure envisages an arrangement for mounting a powertrain of a four-wheeled vehicle of a body-on-frame type, wherein the powertrain is mounted on a chassis in an orientation transverse to the longitudinal axis of the vehicle defined by the chassis. The powertrain 100 typically comprises an internal combustion engine that generates mechanical power by combustion of fuel, and a transmission mechanism that transmits the mechanical power generated by the engine to the wheels of the vehicle after performing a desired speed ratio change. The chassis 200 is defined a pair of substantially parallel long members 210 a, 210 b arranged along the longitudinal orientation of the vehicle and a plurality of cross members spanning across the long members 210 a, 210 b.

Figure 1B:
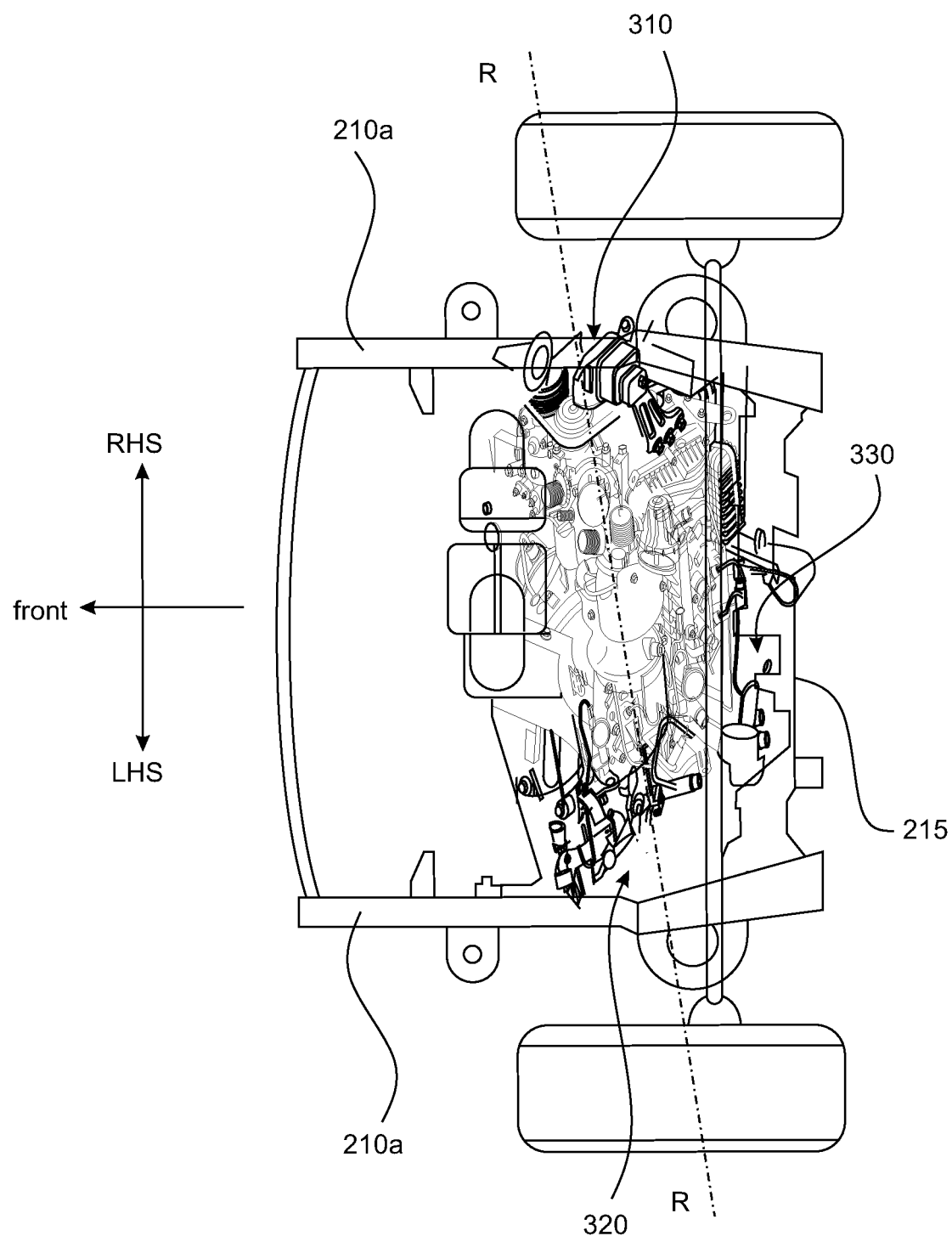
FIG. 1B illustrates a top view of powertrain mounting arrangement of FIG. 1A.

The mounting arrangement of the present disclosure, as shown in FIGS. 1A, 1B, comprises a right-side powertrain mounting assembly 310 for supporting the powertrain 100 on the right-hand side with respect to the operative front of the vehicle, a left-side powertrain mounting assembly 320 for supporting the powertrain 100 on the left-hand side with respect to the operative front of the vehicle, and a powertrain roll-restricting and mounting assembly 330 for supporting the powertrain 100 on the rear side of the powertrain 100. In an embodiment, the vehicle is a front-wheel drive vehicle.

The isometric view of FIG. 1A and the top view of FIG. 1B illustrate the mounting arrangement of the present disclosure, wherein the powertrain 100 is mounted on the chassis 100 by means of a right-side powertrain mounting assembly 310, a left-side powertrain mounting assembly 320 and a powertrain roll-restricting and mounting assembly 330. The right-side powertrain mounting assembly 310 is fitted on the right-hand side long member 210 a, the left-side powertrain mounting assembly 320 is fitted on the right-hand side long member 210 b and the powertrain roll-restricting and mounting assembly 330 is fitted on a cross member 215.

The right-side powertrain mounting assembly 310, illustrated in FIGS. 2, 5A-5C, 6A-6D, comprises at least one right chassis-side bracket 312, a right powertrain-side bracket 314 and a right isolating element 316. The right chassis-side bracket 312 is configured to be fixed on the right-hand side long member 210 a of the chassis 200. The right powertrain-side bracket 314 is configured to be fixed on a predetermined location on the operative right-side of the powertrain 100. The right isolating element 316 is configured to be fitted between the right chassis-side bracket 312 and the right powertrain-side bracket 314. The right-side powertrain mounting assembly 310 includes at least one first fastener 400 a to secure the right chassis-side bracket 312 and the right isolating element 316 with respect to each other, and at least one second fastener 400 b to secure the right isolating element 316 and the right powertrain-side bracket 314 with respect to each other. In an embodiment, the right-side powertrain mounting assembly 310 includes two right chassis-side brackets 312 a, 312 b. The right chassis-side brackets 312 a, 312 b are welded to the chassis 200 and the right powertrain-side bracket 314 is fastened, using threaded fasteners, on an external surface of the powertrain 100 adapted therefor by providing holes. Preferably, the right powertrain-side bracket 314 is a forged bracket. The right chassis-side bracket 312 is a formed sheet metal bracket.

Figure 2:
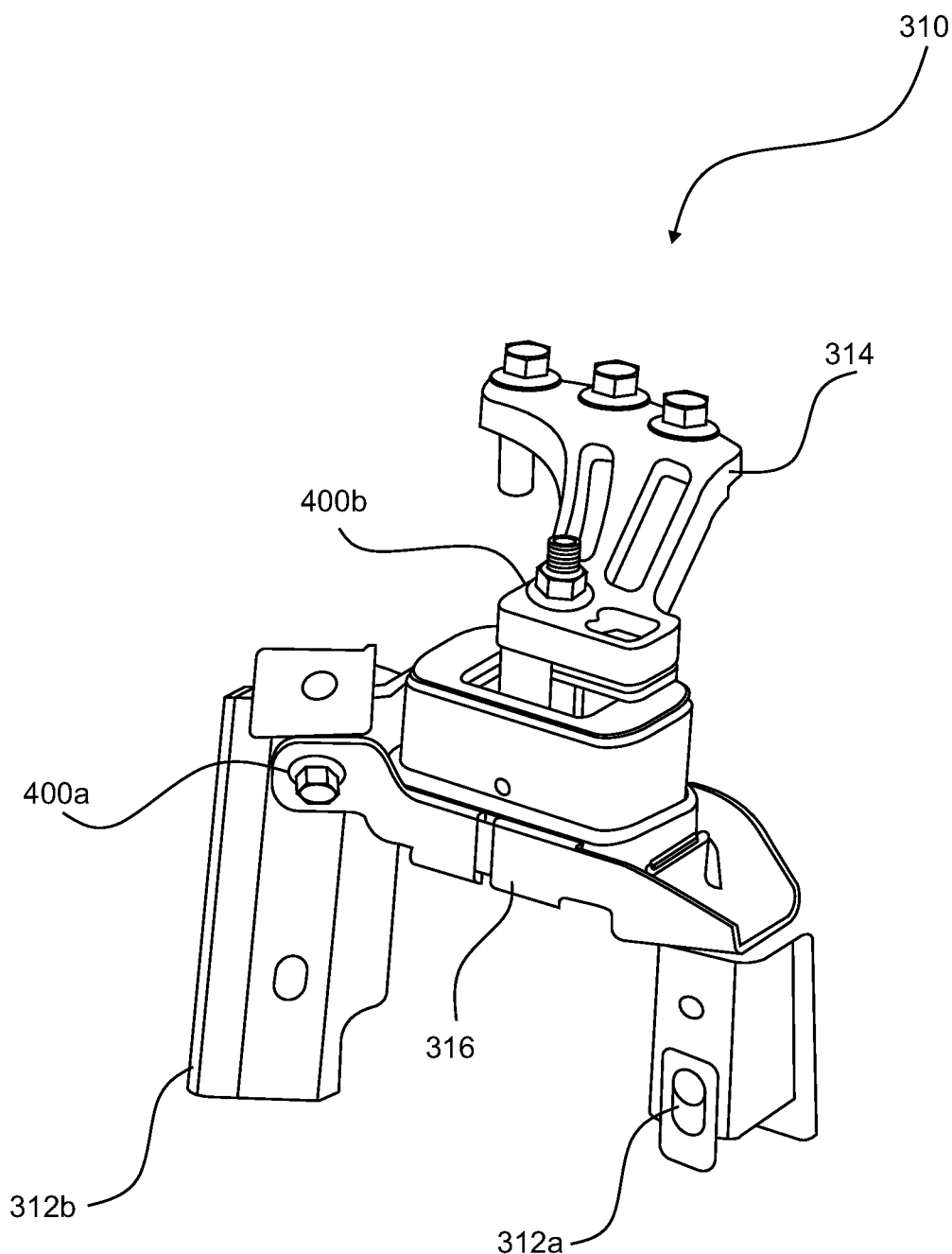
FIG. 2 shows an isometric view of a right-side powertrain mounting assembly.

FIG. 2 illustrates an isometric view of the right-side powertrain mounting assembly 310. The right chassis-side brackets 312 a and 312 b, the right powertrain-side bracket 314 and the right isolating element 316 define the right-side powertrain mounting assembly 310. Fasteners 318 a, 318 b are provided for securing the brackets 312, 314 to the right isolating element 316.

The left-side powertrain mounting assembly 320, illustrated in FIGS. 3, 7A-7C, 8A-8E, comprises at least one left chassis-side bracket 322, a left powertrain-side bracket 324 and a left isolating element 326. The left chassis-side bracket 322 is configured to be fixed on the chassis 200. The left powertrain-side bracket 324 is configured to be fixed on a predetermined location on the operative left-side of the powertrain 100. The left isolating element 326 is configured to be fitted between the left chassis-side bracket 322 and the left powertrain-side bracket 324. The left-side powertrain mounting assembly 310 includes at least one third fastener 400 c to secure the left chassis-side bracket 322 and the left isolating element 326 with respect to each other, and at least one fourth fastener 400 d to secure the left isolating element 326 and the left powertrain-side bracket 324 with respect to each other. In an embodiment, the left-side powertrain mounting assembly 320 includes two left chassis-side brackets 322 a, 322 b. The left-side powertrain mounting assembly 320 comprises two left chassis-side brackets that include a first left chassis-side bracket 322a and a second left chassis-side bracket 322b. The first left chassis-side bracket 322 a is configured to be welded to the chassis 200 and the second left chassis-side bracket 322 b is configured to be fastened to the chassis 200 using further fasteners 400 h. In an embodiment, the second left chassis-side bracket 322b is configured to be fastened to the chassis 200 and to the first left chassis-side bracket 322a. The left powertrain-side bracket 324 is fastened, using threaded fasteners, on an external surface of the powertrain 100 adapted therefor by providing holes. Preferably, the left powertrain-side bracket 324 is a cast bracket. The left chassis-side brackets 322 a, 322 b is a formed sheet metal bracket.

Figure 3:
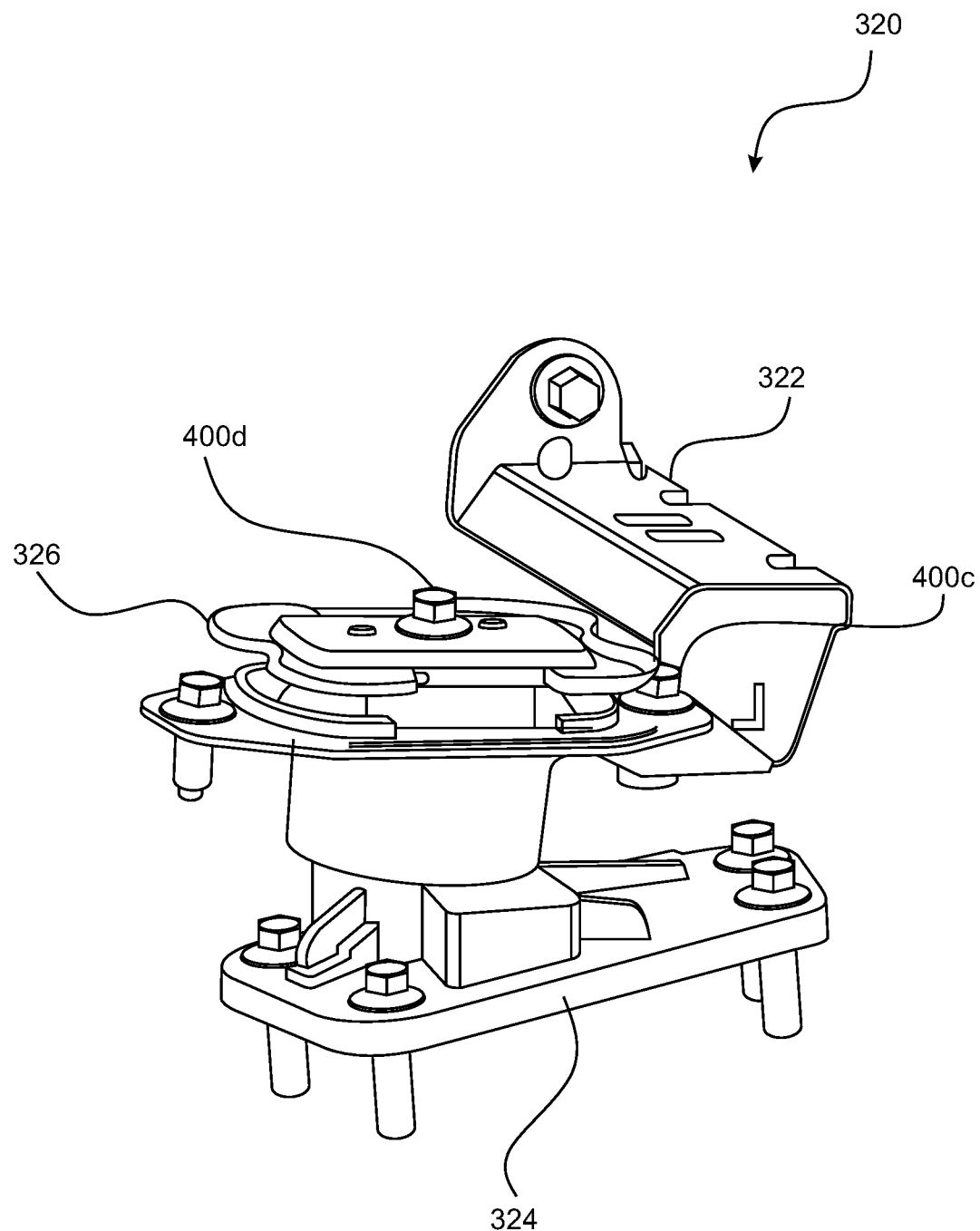
FIG. 3 shows an isometric view of the second powertrain mounting assembly.

FIG. 3 illustrates an isometric view of the left-side powertrain mounting assembly 320. The left chassis-side bracket 322, the left powertrain-side bracket 324 and the left isolating element 326 define the left-side powertrain mounting assembly 320. Fasteners 328a, 328 b are provided for securing the brackets 322, 324 to the left isolating element 326.

The powertrain roll-restricting and mounting assembly 330, illustrated in FIGS. 4, 9A-9B, 10A-10C, comprises a rear powertrain-side bracket 332 and a roll restricting and isolating element 334. The rear powertrain-side bracket 332 is configured to be fixed on a predetermined location on the operative rear-side of the powertrain 100. The roll restricting and isolating element 334 is configured to attach the rear powertrain-side bracket 332 at a predetermined location on the cross member 215 of the chassis 200. The powertrain roll-restricting and mounting assembly 330 includes at least one fifth fastener 400 e configured to secure the third chassis-side bracket and the roll isolating element with respect to each other. The rear powertrain-side bracket is a formed sheet metal bracket. In an embodiment, the roll restricting and isolating element 334 is a casted component.

Figure 4:
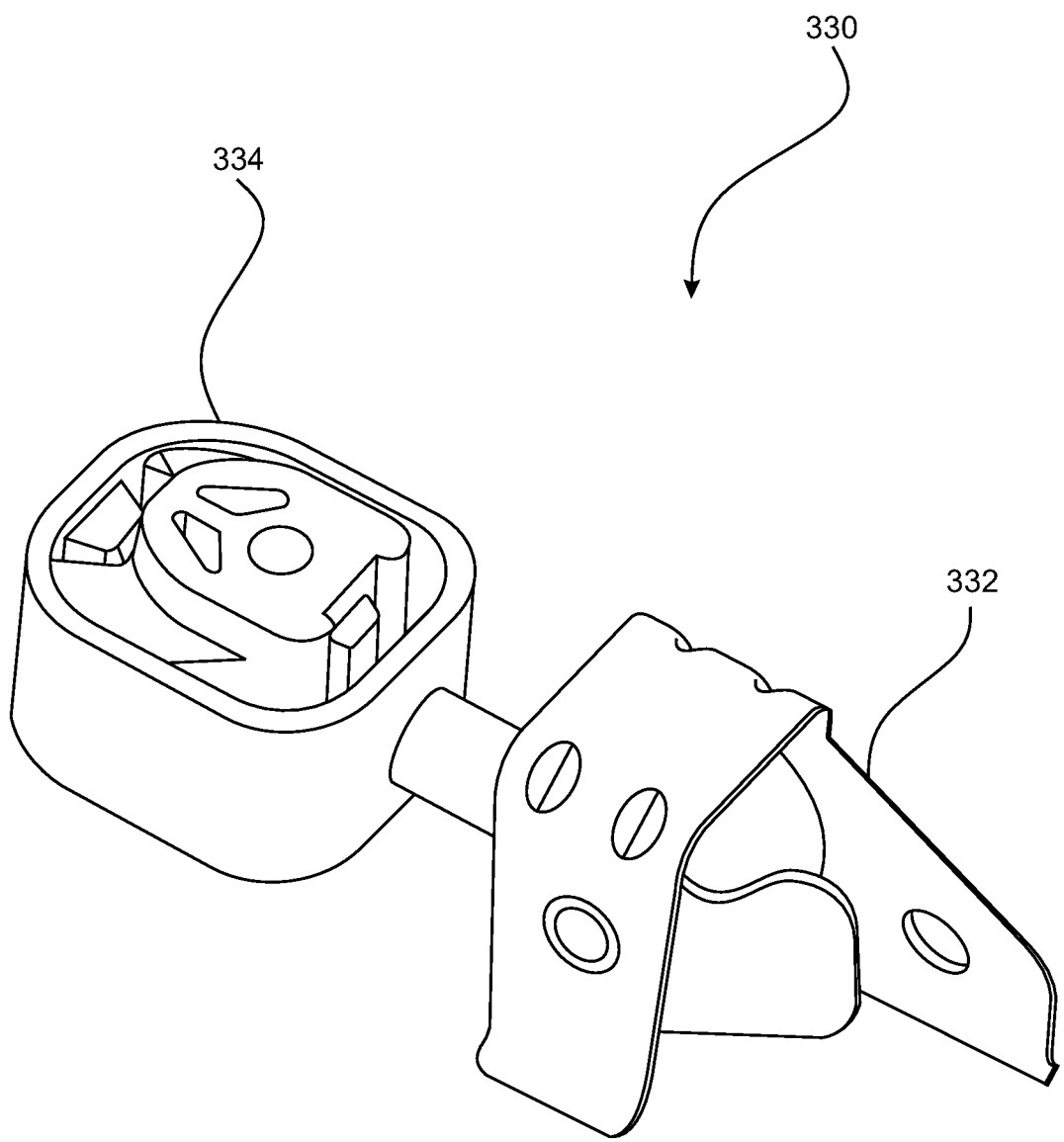
FIG. 4 shows an isometric view of a third powertrain mounting assembly.

FIG. 4 illustrates an isometric view of the powertrain roll-restricting and mounting assembly 330. The rear powertrain-side bracket 332 and the roll restricting and isolating element 334 define the powertrain roll-restricting and mounting assembly 330. A fifth fastener (not shown in FIG. 4) is provided for securing the rear powertrain-side bracket 332 to the roll restricting and isolating element 334.

Preferably, the cross member 215 is uniquely designed and incorporated in the chassis 200 for providing support to the powertrain 100 on the rear and lower side of the powertrain 100. The cross member 215 may have a substantially low-lying extension with respect to the long members 210 a, 210 b of the chassis 200.

The right isolating element 316, the left isolating element 326 and the third roll restricting and isolating element 334 together provide isolation between the powertrain 100 and the chassis 200 by substantially dampening the various modes of vibration of the powertrain 100. Specifically, the right isolating element 316 and the left isolating element 326 are predominantly adapted to dampen the amplitude of vibration of the powertrain 100 in the operative vertical direction, while the third resilient element 3342 is predominantly adapted to dampen the amplitude of vibration of the powertrain 100 in the operative horizontal direction and the torsional amplitude of vibration of the powertrain 100.

Typically, the fasteners used in the assemblies are bolts.

According to an aspect of the present disclosure, the right-side powertrain mounting assembly 310 and the left-side powertrain mounting assembly 320 are located on the torque roll axis R-R of the powertrain 100, as illustrated in FIGS. 1A, 1B. The powertrain roll-restricting and mounting assembly 330 is located below the torque roll axis R-R of the powertrain 100. In an embodiment, the right-side powertrain mounting assembly 310 and the left-side powertrain mounting assembly 320 are located the above the centre of gravity (not shown in Figures) and the powertrain roll-restricting and mounting assembly 330 is located below the centre of gravity of the powertrain 100. Thus, a substantial volume of the powertrain 100 lies below the plane defined by the long members 210 a, 210 b of the chassis 200. Accordingly, the mounting arrangement of the powertrain 100 of the present disclosure facilitates assembly of the powertrain 100 on the chassis 200 through lowering of the powertrain 100 on the chassis 200 from the top. Hence, ease of assembly is provided, and safety and comfort of assembly personnel is enhanced.

Figure 6A:
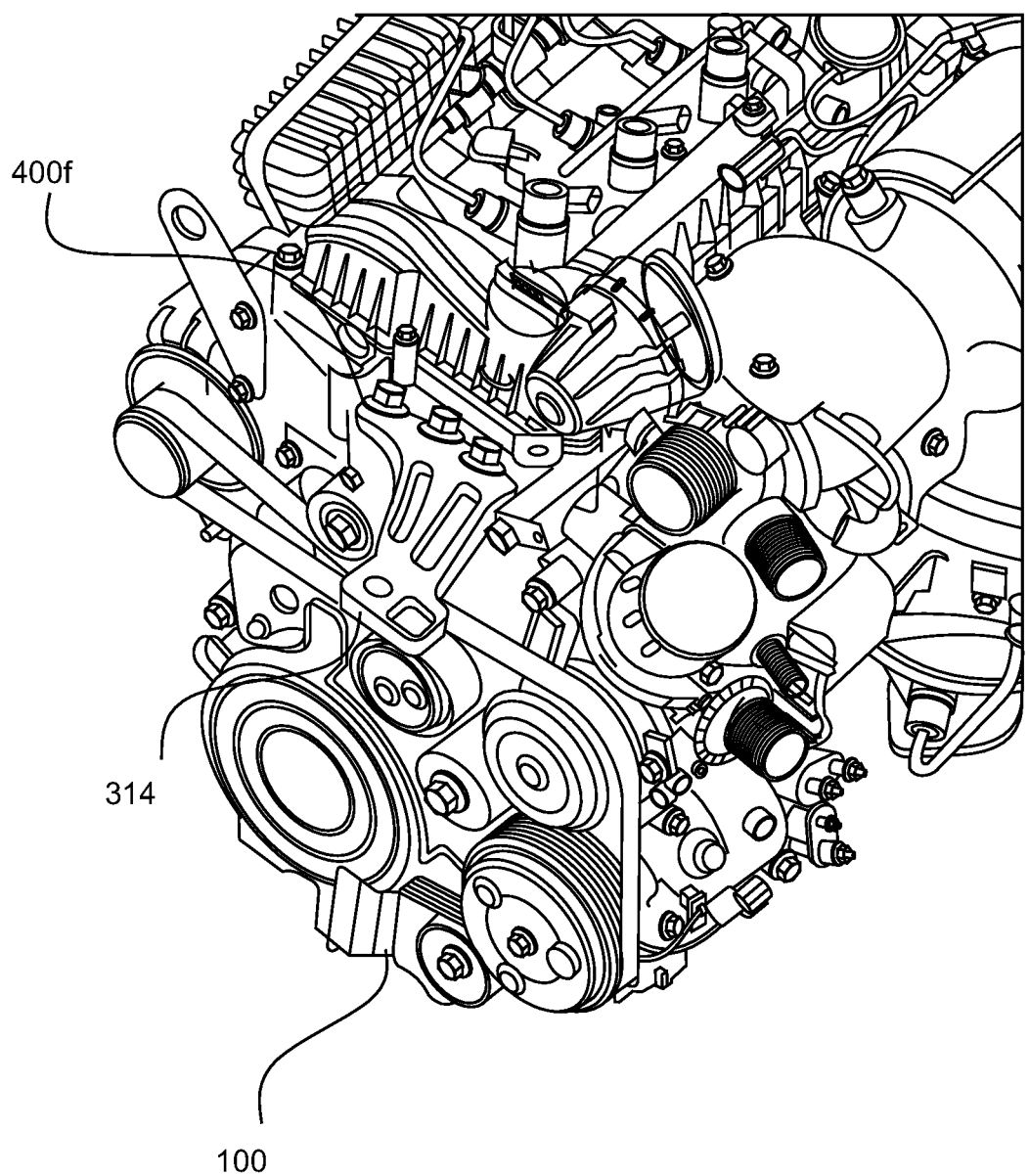
FIG. 6A represent the steps of assembling of the right powertrain-side bracket on the powertrain formed by the components of FIG. 5B.
Figure 6B:
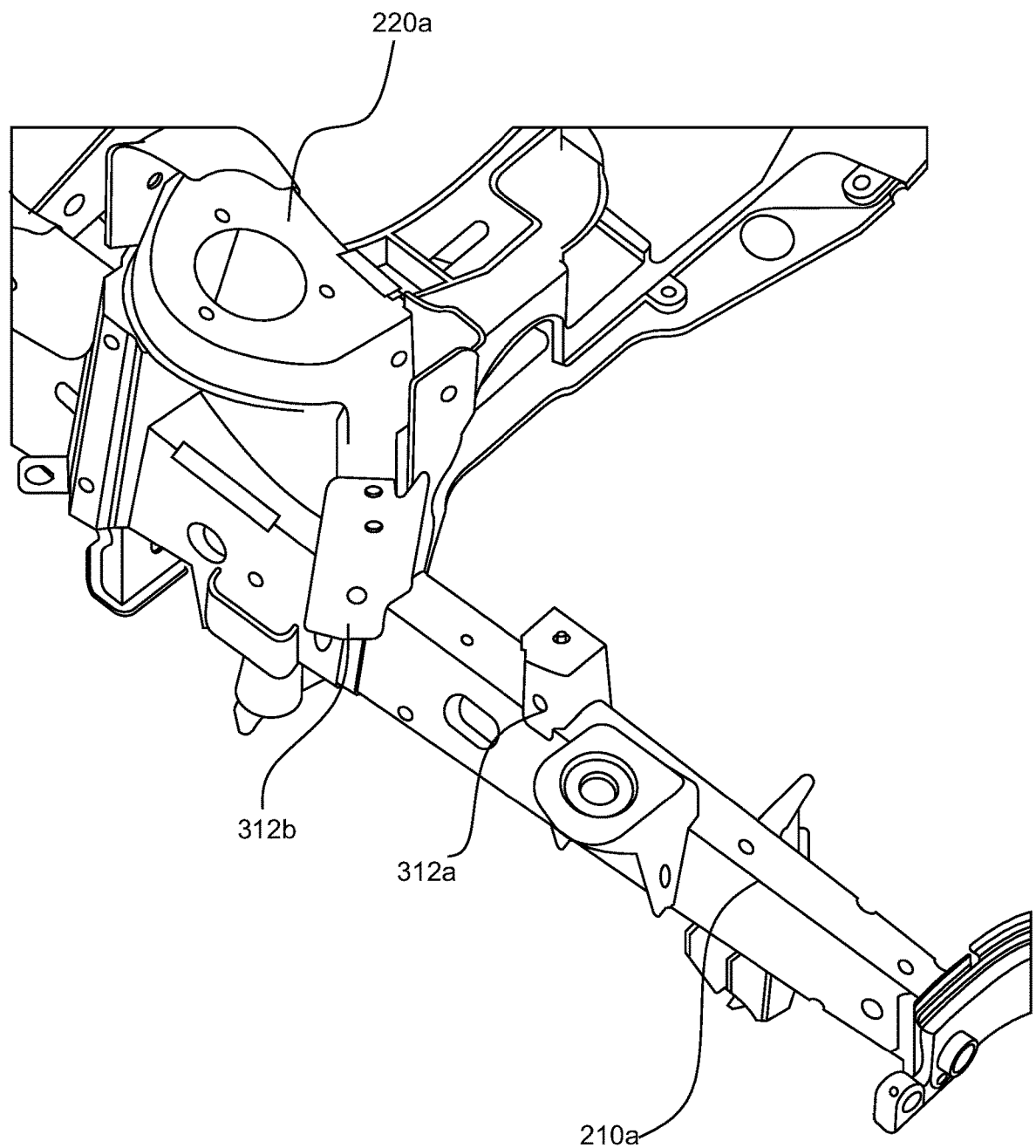
FIG. 6B represent the steps of assembling of the right chassis-side brackets on the right-hand side long member formed by the components of FIG. 5A.
Figure 6C:
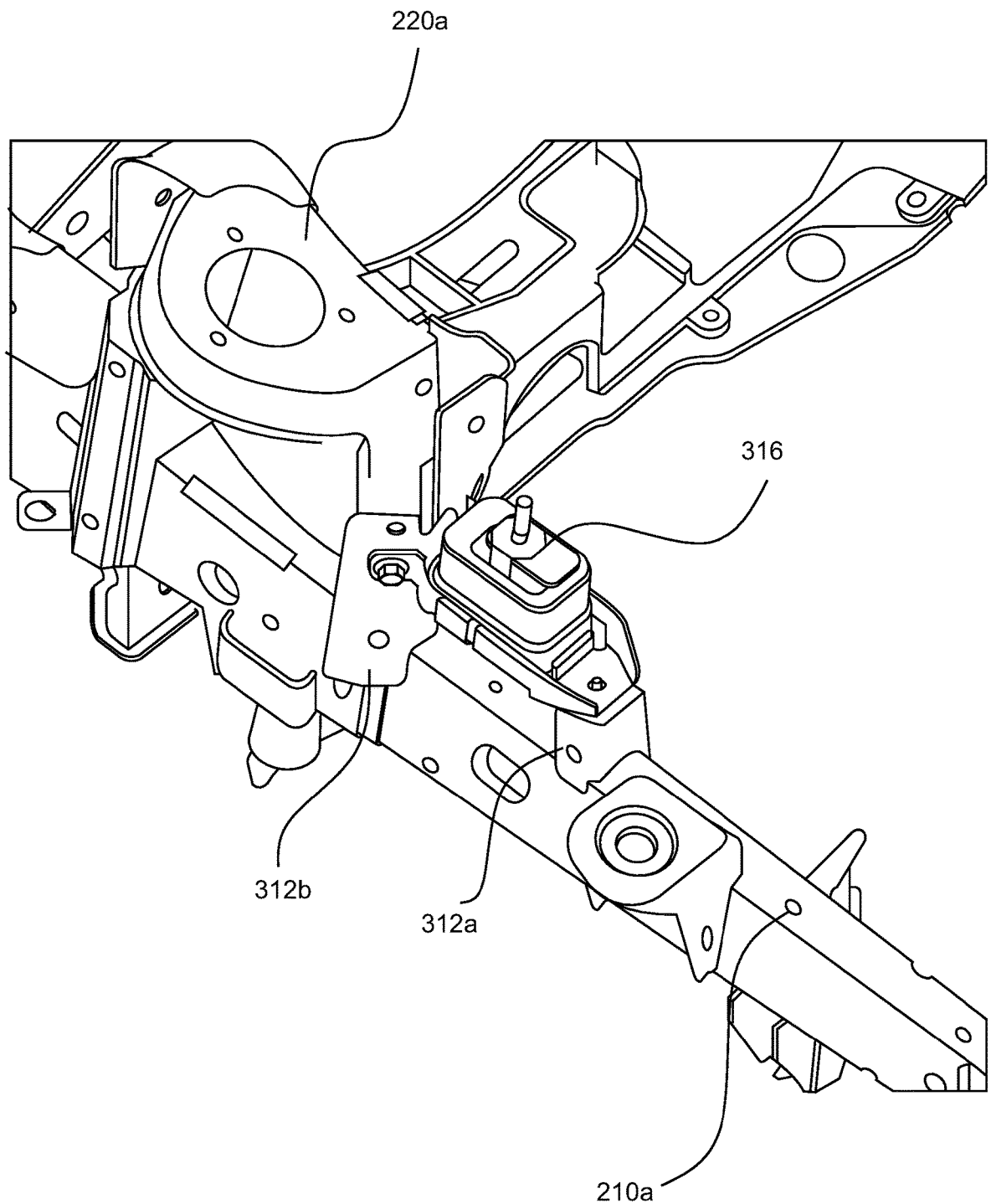
FIG. 6C represent the steps of assembling of the right isolating element on the right chassis-side brackets formed by the components of FIG. 5C.
Figure 6D:
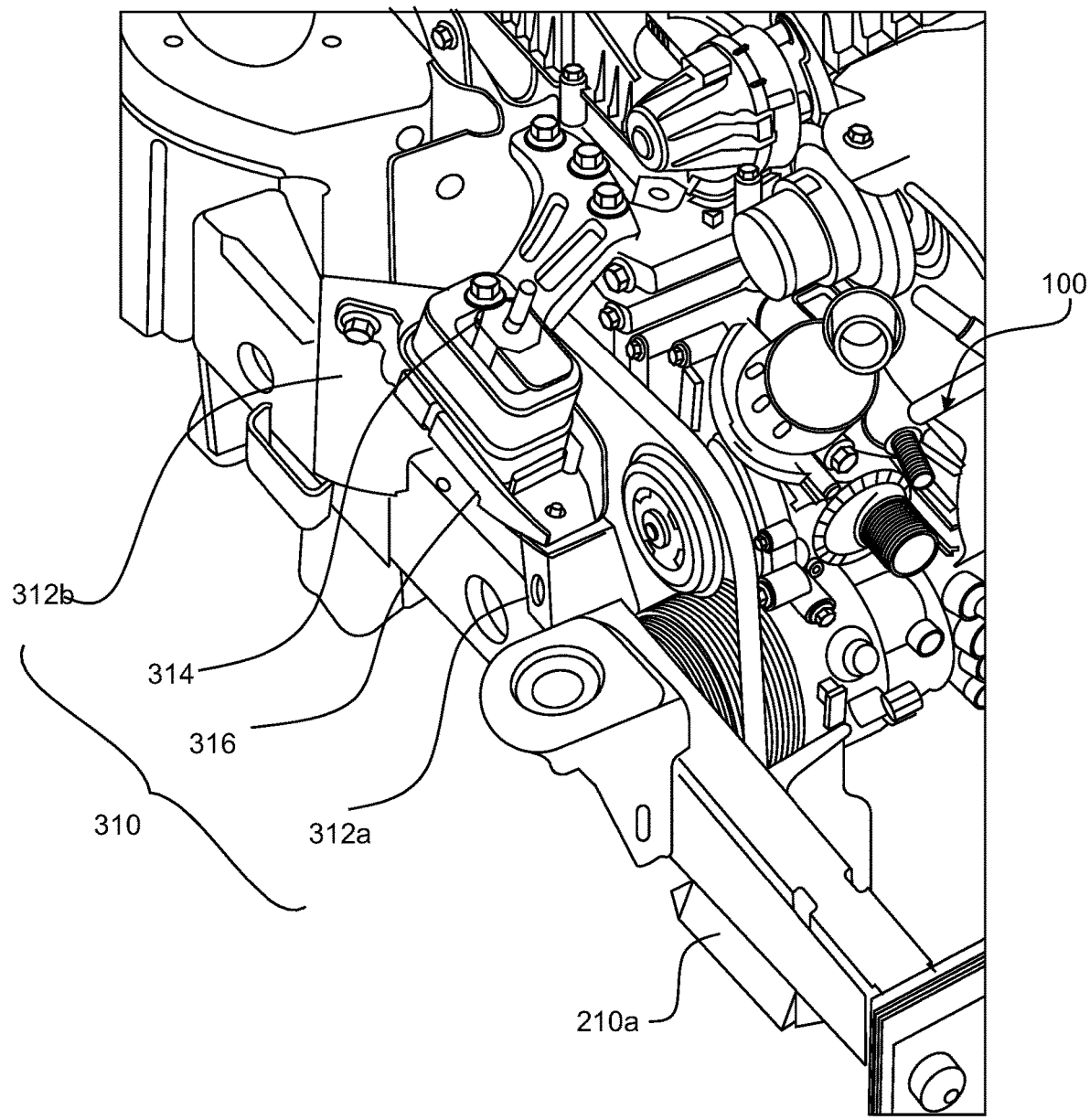
FIG. 6D represent the steps of assembling of the right-side powertrain mounting assembly formed by the components of FIG. 5A, 5B, 5C.
Figure 8A:
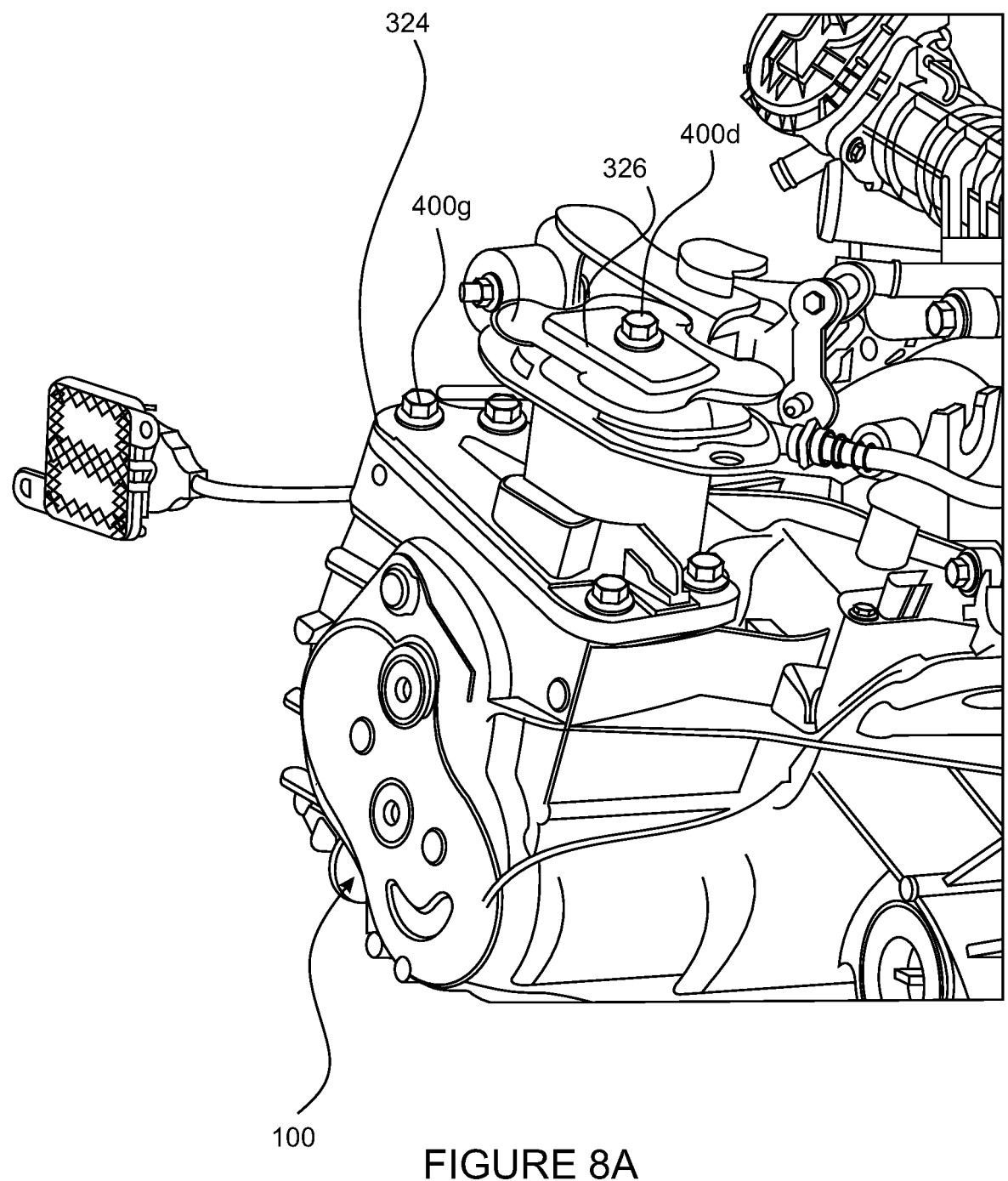
FIG. 8A represent a side view of the steps of assembling of the left chassis-side bracket and the left isolating element on the powertrain formed by the components of FIGS. 7B, 7C.
Figure 8B:
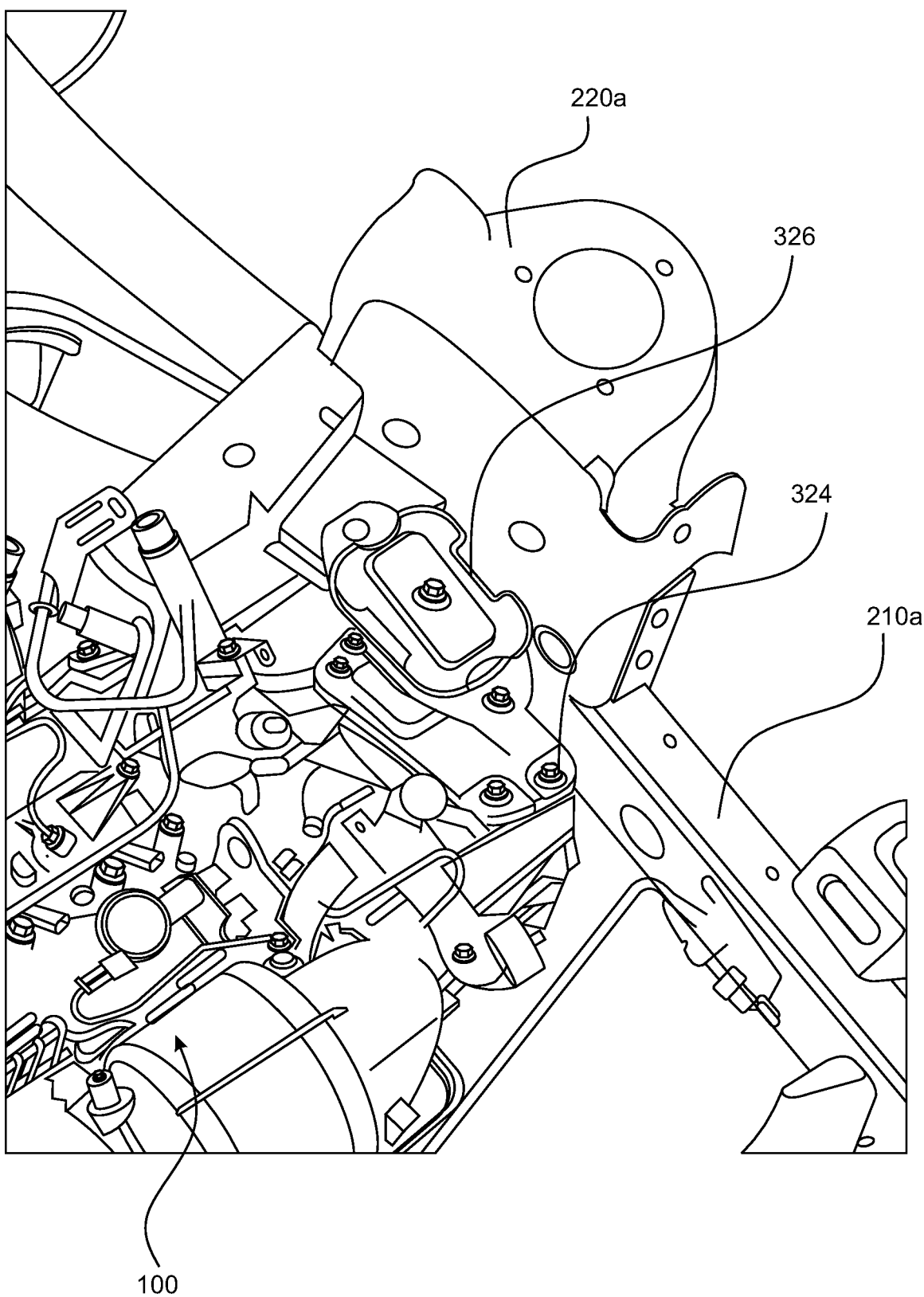
FIG. 8B represent a top view of the steps of assembling of the left chassis-side bracket and the left isolating element on the powertrain formed by the components of FIGS. 7B, 7C.
Figure 8C:
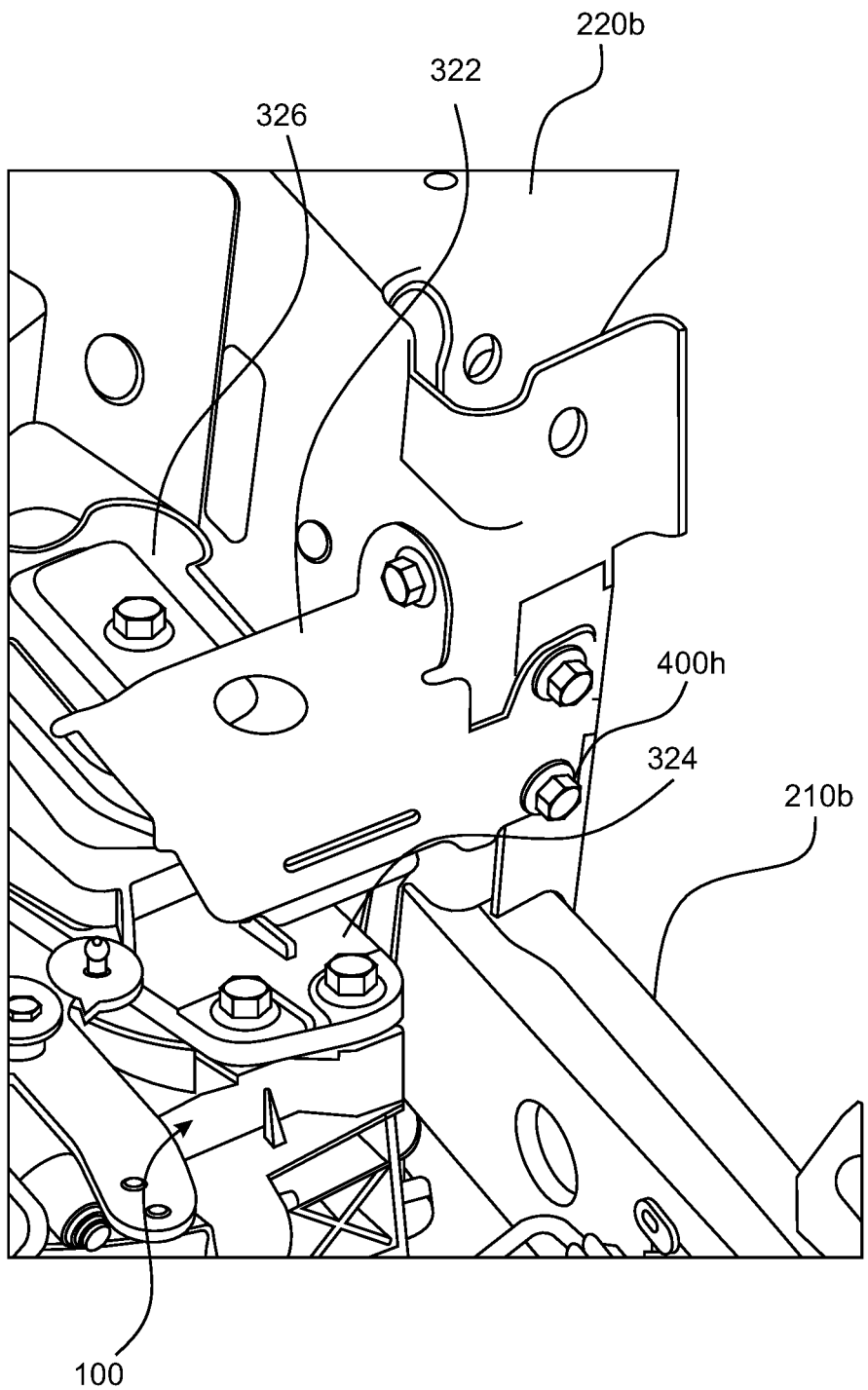
FIG. 8C represent a side view of the steps of assembling of the left powertrain-side bracket on the left-hand side long member formed by the components of FIG. 7A.
Figure 8D:
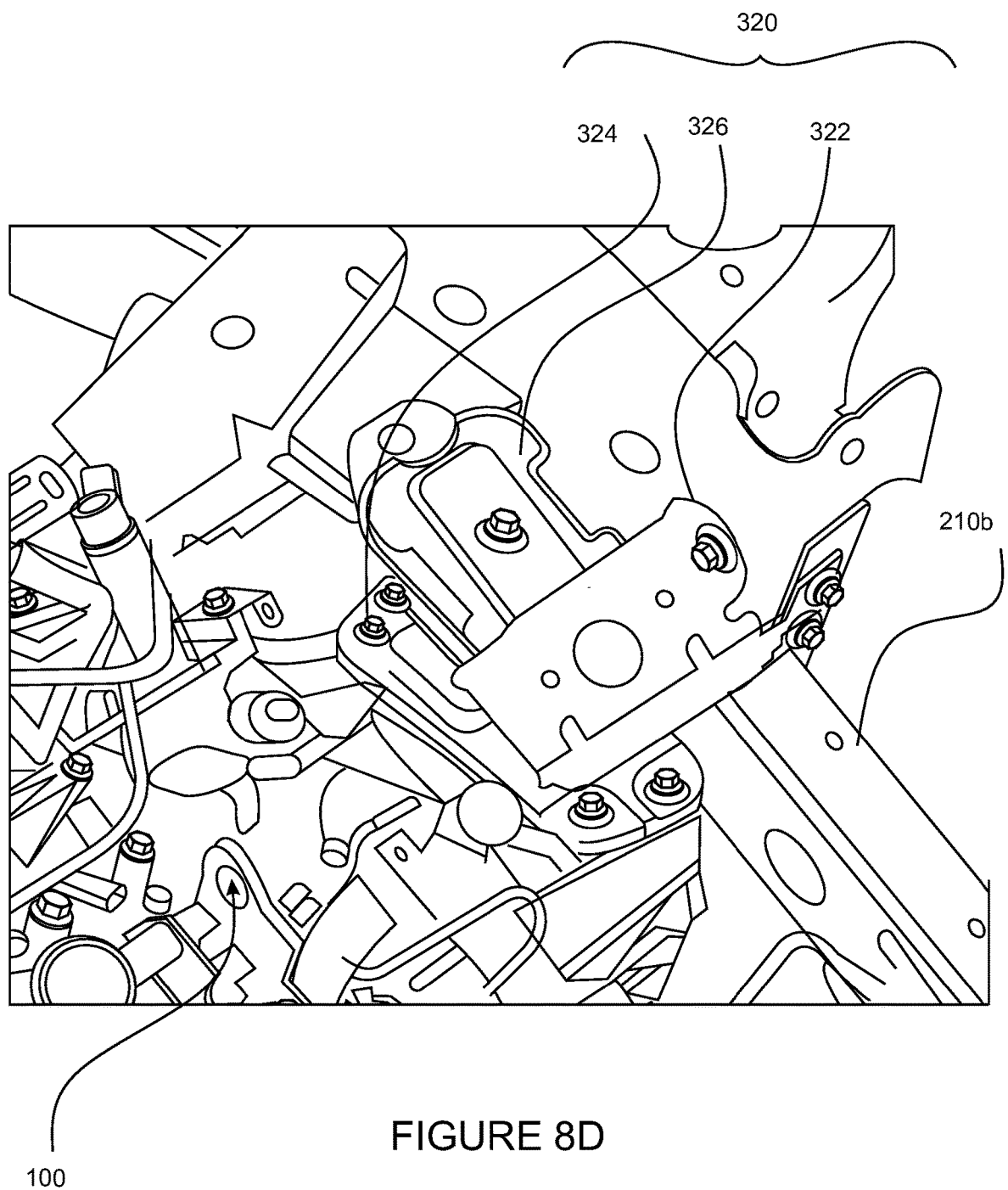
FIG. 8D represent a top view of the steps of assembling of the left powertrain-side bracket on the left-hand side long member formed by the components of FIG. 7A.
Figure 8E:
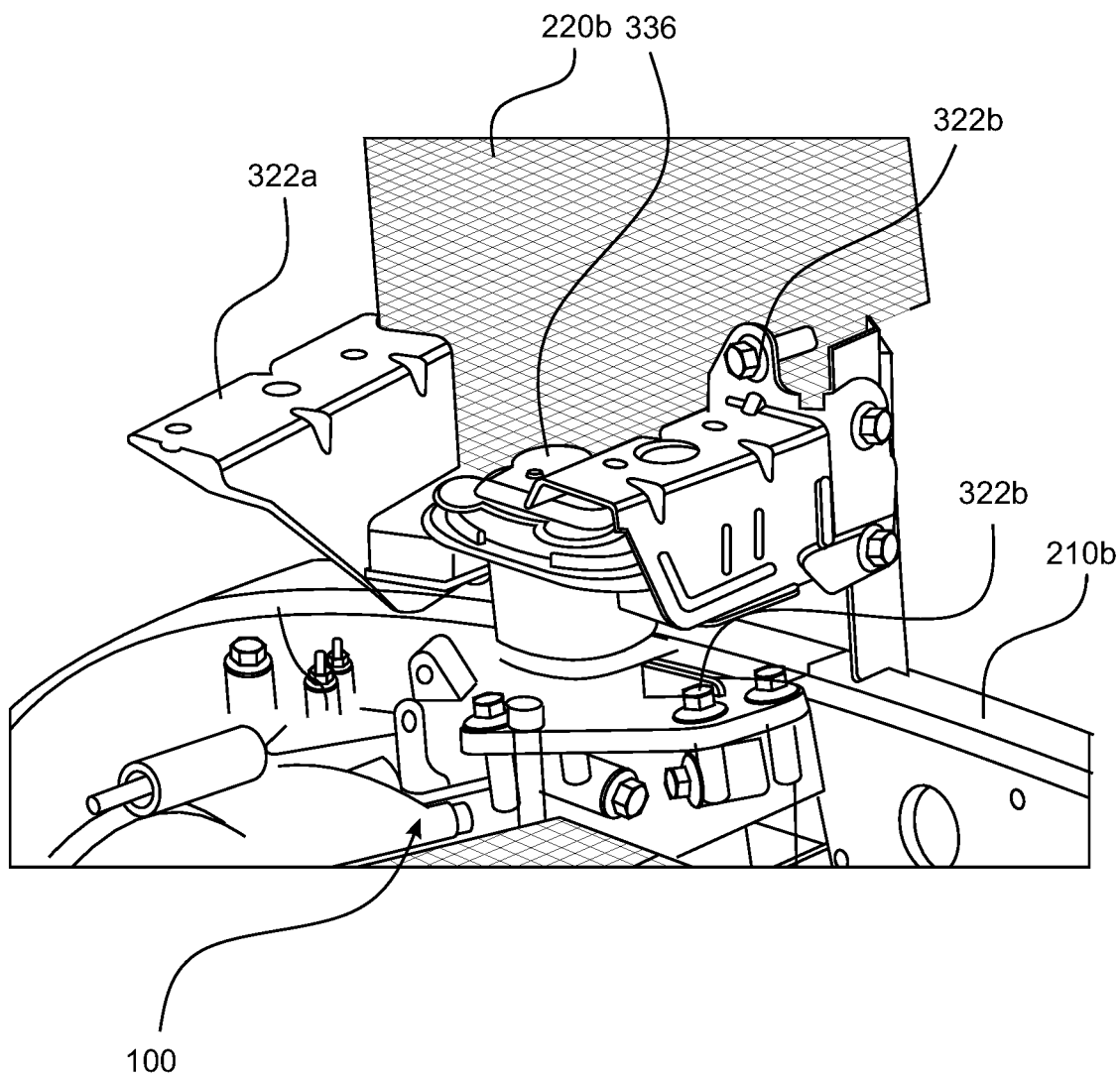
FIG. 8E represent the steps of assembling of the left side powertrain mounting assembly formed by the components of FIGS. 7A, 7B, 7C.

In a preferred embodiment of the present disclosure, the right powertrain-side bracket 314 is located above the right chassis-side bracket 312, as illustrated in FIG. 6D, whereas the left powertrain-side bracket 324 is located below the left chassis-side bracket 322, as illustrated in FIG. 8D. In an embodiment, the powertrain 100 is mounted on the chassis 200 such that the engine portion is located on the right side and the transaxle portion is located on the left side. Thus, the right powertrain-side bracket 314 is configured to be fixed on the engine portion and the left powertrain-side bracket 324 is configured to be fixed on the transaxle portion of the powertrain 100. In a preferred embodiment, the right chassis-side bracket 312 is located adjacent to a right-hand side suspension-supporting column 220a that is provided on the right-hand side long member 210a of the chassis 200. On the other hand, in an embodiment, a first left chassis-side bracket 322 a and a second left chassis-side bracket 322 b, as shown in FIG. 8E, are located on a left-hand side suspension-supporting column 220 b that is provided on the left-hand side long member 210 b of the chassis 200.

In an embodiment, the right isolating element 316 comprises a first outer rigid element and a first inner rigid element and a first resilient element sandwiched between the first outer rigid element and the first inner rigid element. Similarly, the left isolating element 326 comprises a second outer rigid element and a second inner rigid element and a second resilient element sandwiched between the second outer rigid element and second first inner rigid element.

In an embodiment, the roll restricting and isolating element 334 comprises a bushing 3341, a third resilient element 3342 and a link rod 3343 disposed between the bushing 3341 and the third resilient element 3342. The bushing 3341 is configured to be coupled to the rear powertrain-side bracket 332. The third resilient element 3342 is adapted to be coupled to the cross member 215 of the chassis 200. In an embodiment, the axis of the bushing 3341 is in a plane perpendicular to a plane of symmetry of the third resilient element 3342.

Also envisaged is a method of mounting a powertrain 100 on a chassis 200 of a vehicle with the mounting arrangement as described above. The preferred method involves carrying out the right-side powertrain mounting assembly 310, as illustrated through FIGS. 6A-6D, followed by the powertrain roll-restricting and mounting assembly 330, as illustrated through FIGS. 8A-8E, and finally the left-side powertrain mounting assembly 320, as illustrated through FIGS. 10A-10B.

Figure 10A:
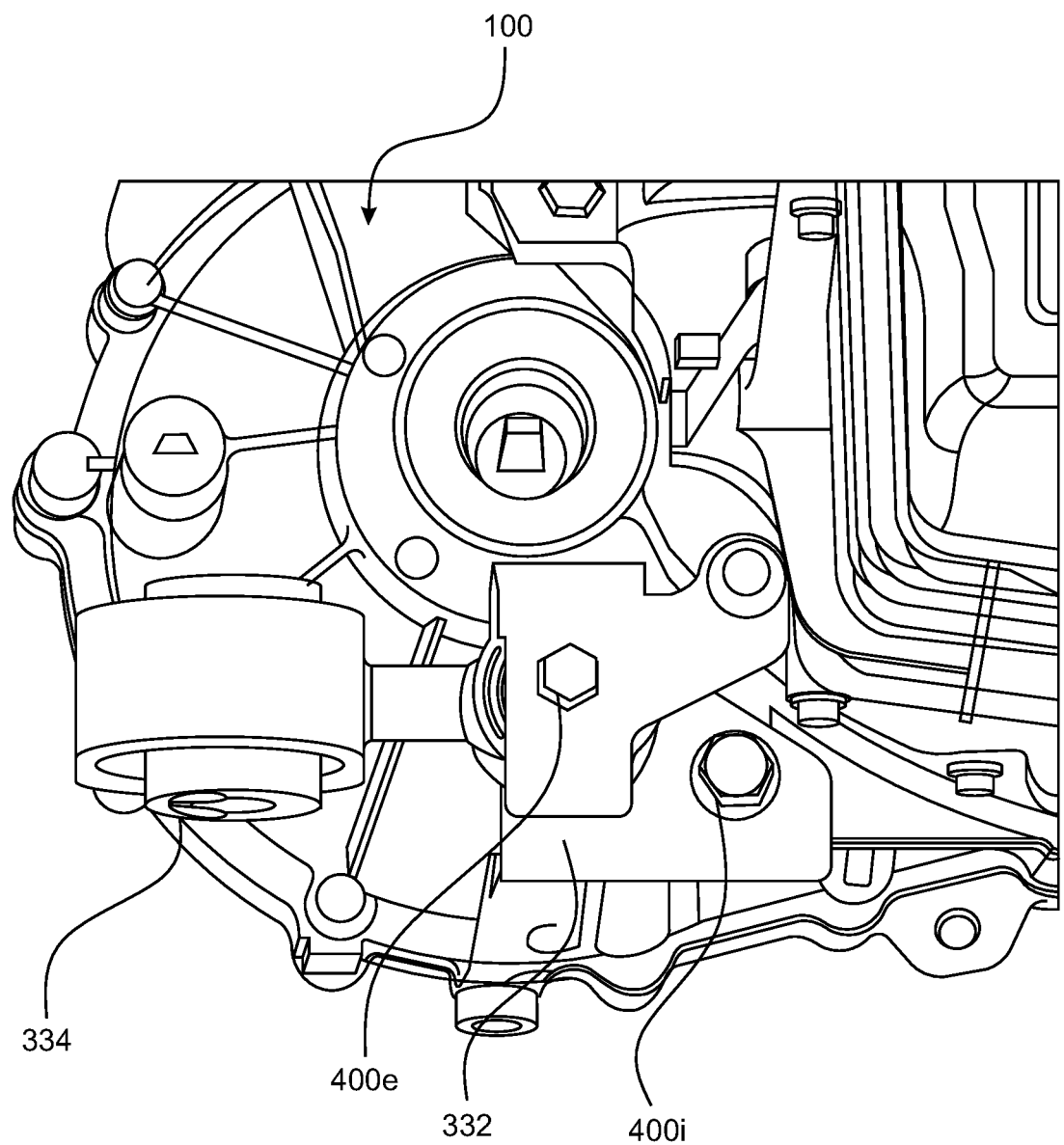
FIG. 10A represent a top view of the steps of assembling of the rear powertrain-side bracket and the roll restricting and isolating element formed by the components of FIGS. 9A, 9B.
Figure 10B:
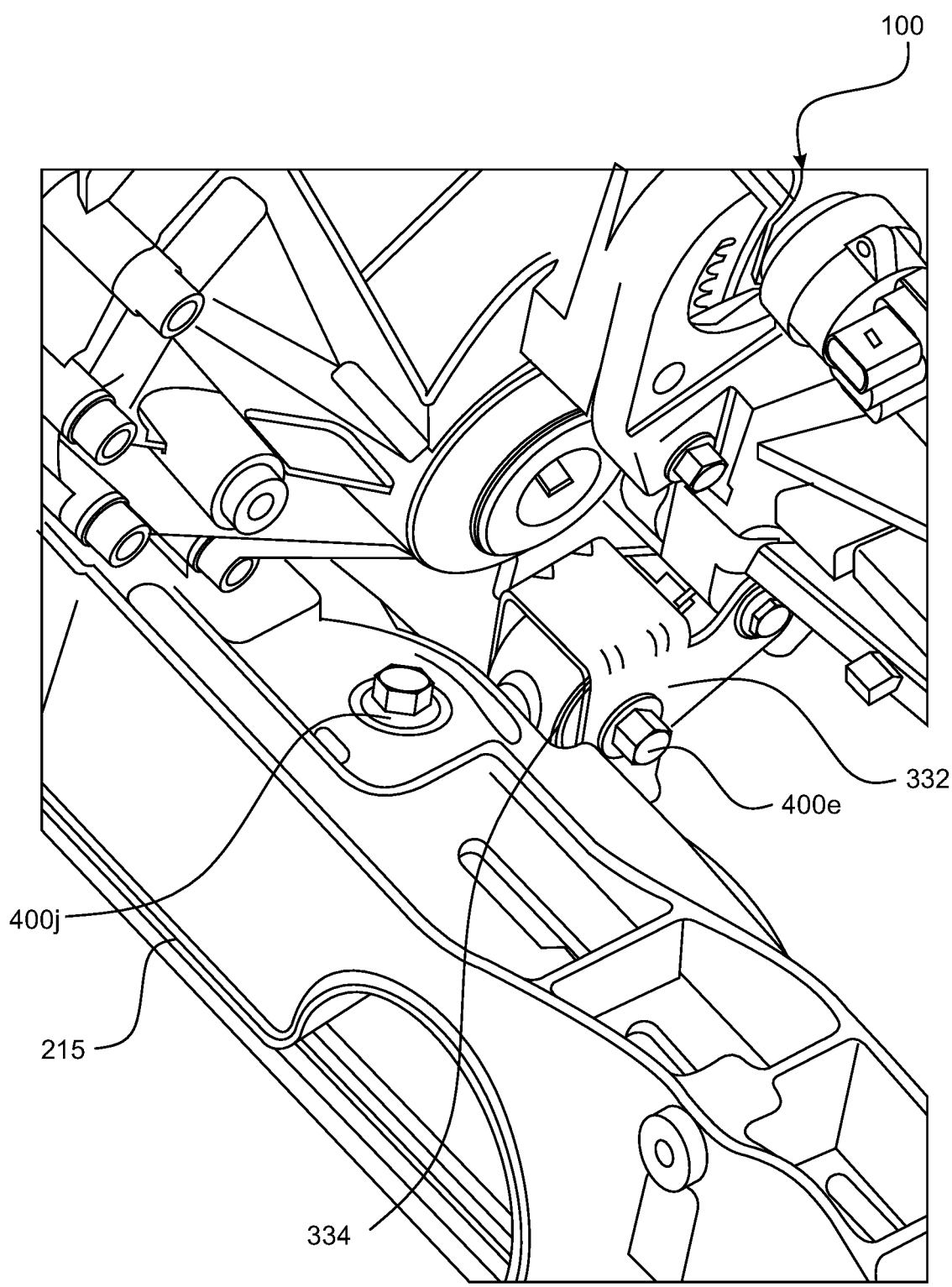
FIG. 10B represent a side view of the steps of assembling of the rear powertrain-side bracket and the roll restricting and isolating element formed by the components of FIGS. 9A, 9B.

The method comprises the steps of:
i. pre-assembling the right powertrain-side bracket 314, the left powertrain-side bracket 324 and the rear powertrain-side bracket 332 and the roll restricting and isolating element 334 on the powertrain 100 (as shown in FIGS. 6A, 8A and 10A respectively);
ii. fixing the right chassis-side brackets 312 a, 312 b to the chassis 200 (as shown in FIG. 6B);
iii. fixing the first left chassis-side brackets 322 a to the chassis 200;
iv. fixing the first resilient mount to the right chassis-side bracket 312 (as shown in FIG. 6C);
v. decking the engine from above while aligning the right powertrain-side bracket 314 with the first resilient mount to complete the right-side powertrain mounting assembly 310 (as shown in FIGS. 6D, 8B);
vi. fixing the right powertrain-side bracket 314 with the first resilient mount (as shown in FIG. 6D);
vii. fixing the roll restricting and isolating element 334 to a cross member 215 to complete the powertrain roll-restricting and mounting assembly 330 (as shown in FIG. 10B);
viii. fixing the second left chassis-side bracket 322 b to at least one of the chassis 200 and the first left chassis-side bracket 322 a (as shown in FIG. 8C);
ix. fixing the second left chassis-side bracket 322 b to the left isolating element 326 to complete the left-side powertrain mounting assembly 320 (as shown in FIG. 8E).

Preferably, the step of fixing the right chassis-side bracket 312 to the chassis 200 involves welding the right chassis-side bracket 312 to the chassis 200. The step of fixing the second left chassis-side bracket 322 a to at least one of the first left chassis-side bracket 322 a and the chassis 200 involves fastening the second left chassis-side bracket 322 b to the first left chassis-side bracket 322 a and to the chassis 200 using threaded fasteners.

The step of fixing the second left chassis-side bracket 322 b to at least one of the first left chassis-side bracket 322 a and the chassis 200 involves fastening the second left chassis-side bracket 322 b to the first chassis-side bracket 322a and to the chassis 200 using threaded fasteners.

Figure 5A:
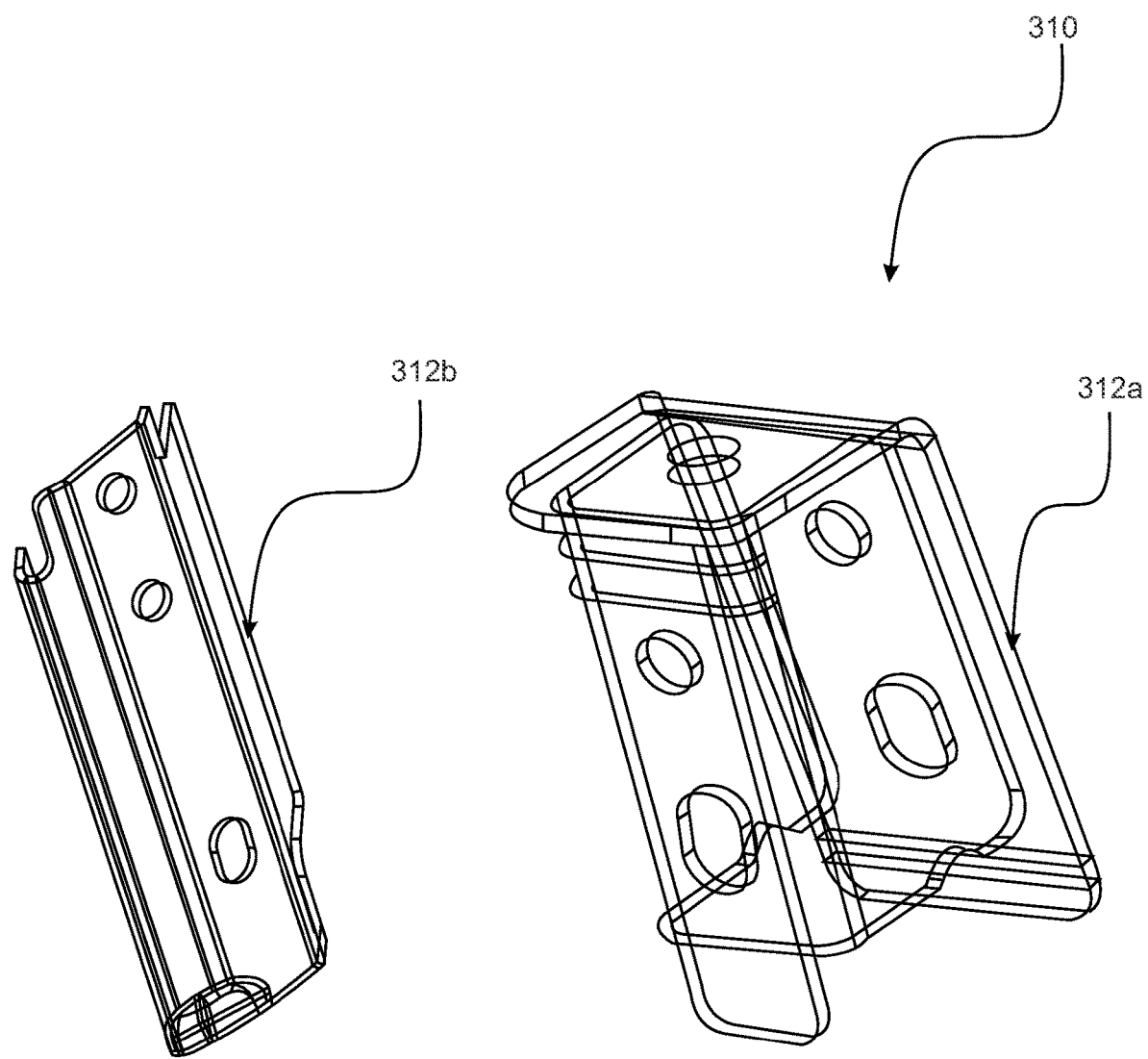
FIG. 5A shows an isometric view of the right chassis-side brackets of FIG. 2.
Figure 5B:
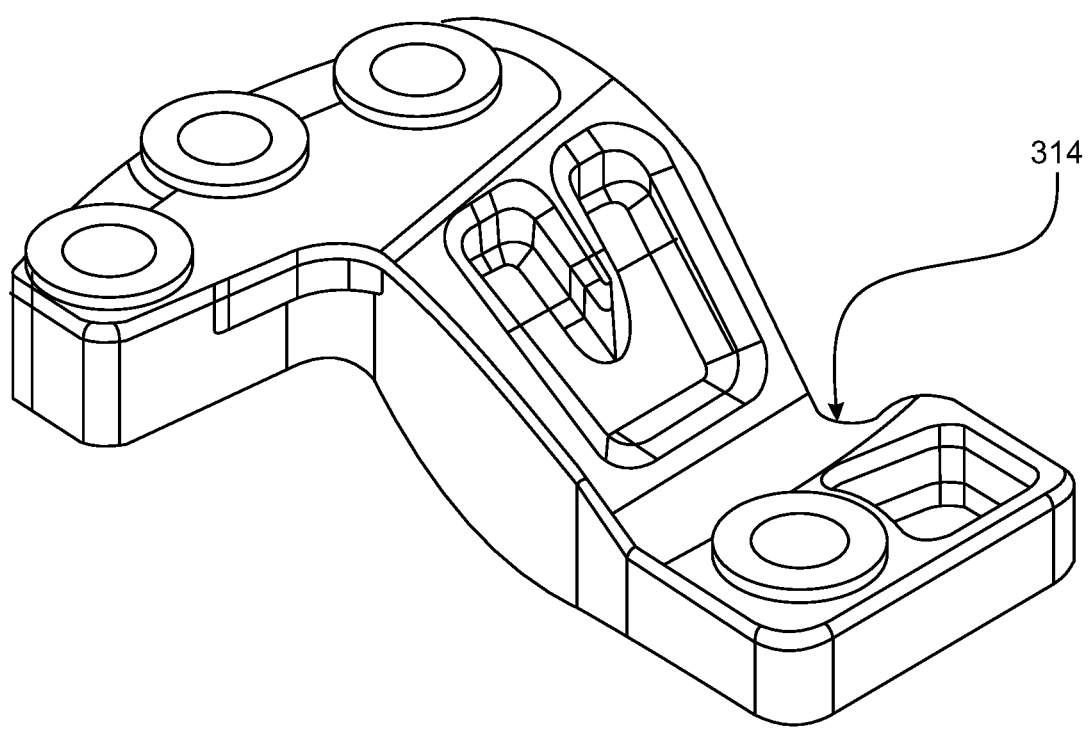
FIG. 5B shows an isometric view of the right powertrain-side bracket of FIG. 2.
Figure 5C:
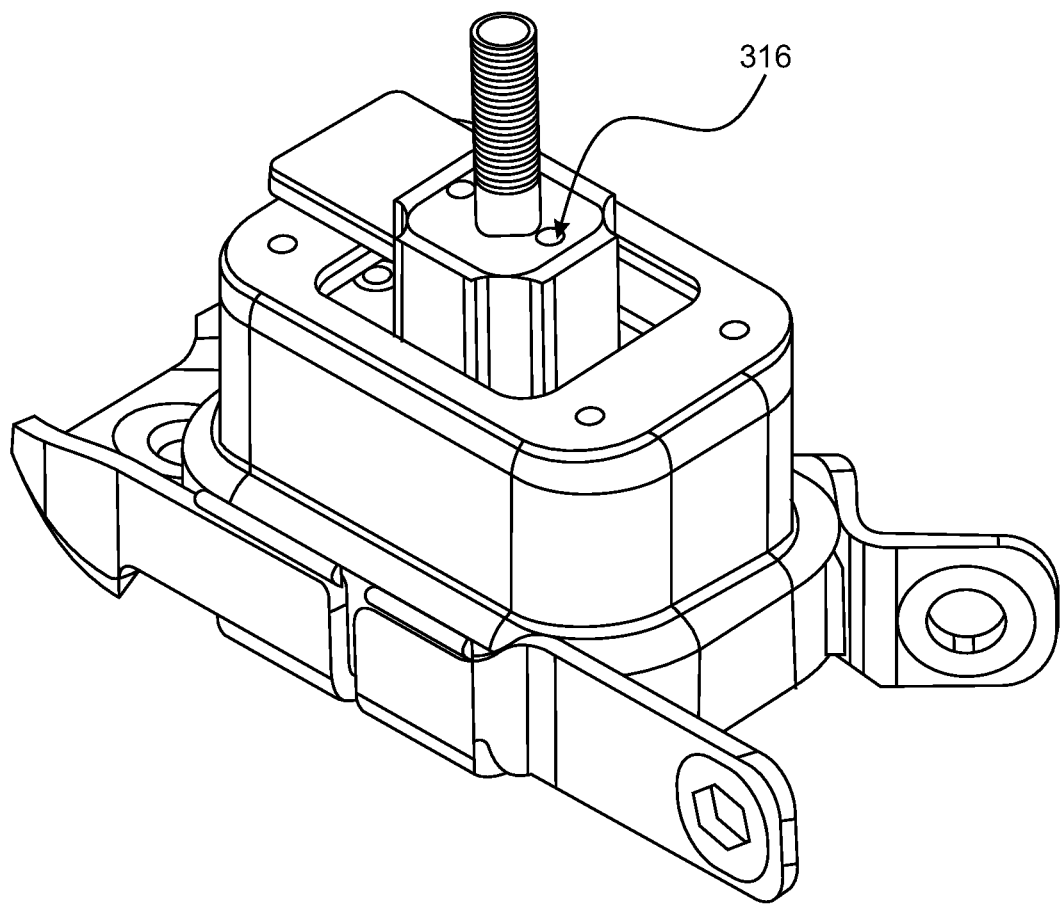
FIG. 5C shows an isometric view of the right isolating element of FIG. 2.

FIG. 5A shows the right chassis-side brackets 312a and 312 b, FIG. 5B shows the right powertrain-side bracket 314 and FIG. 5C shows the right isolating element 316. The right-side powertrain mounting assembly 310 is obtained by assembling the right chassis-side brackets 312a and 312 b, the right powertrain-side bracket 314 and the right isolating element 316.

FIGS. 6A-6D illustrate the steps of assembling the right-side powertrain mounting assembly 310. FIG. 6A shows the right powertrain-side bracket 314 secured on the powertrain 100 by means of sixth fasteners 400 f FIG. 6B shows the right chassis-side brackets 312 a, 312 b secured to the right-hand side long member 210 a by means of welding. FIG. 6C shows the right isolating element 216 secured on the right chassis-side brackets 312 a, 312 b. FIG. 6D shows the completed right-side powertrain mounting assembly 310.

Figure 7A:
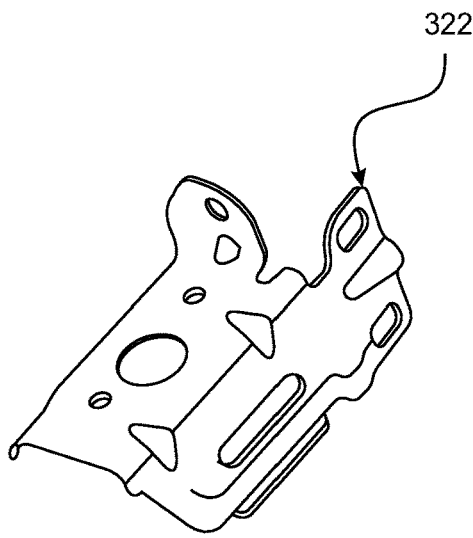
FIG. 7A shows the left chassis-side bracket of FIG. 3.
Figure 7B:
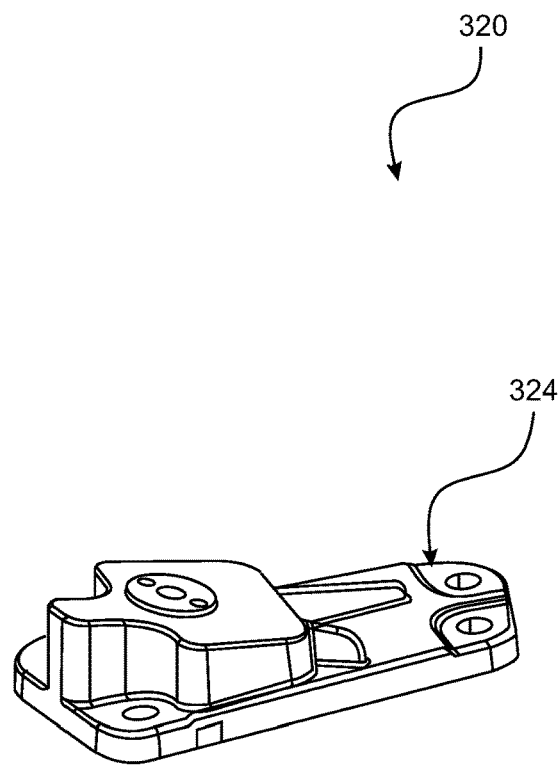
FIG. 7B shows the left powertrain-side bracket of FIG. 3.
Figure 7C:
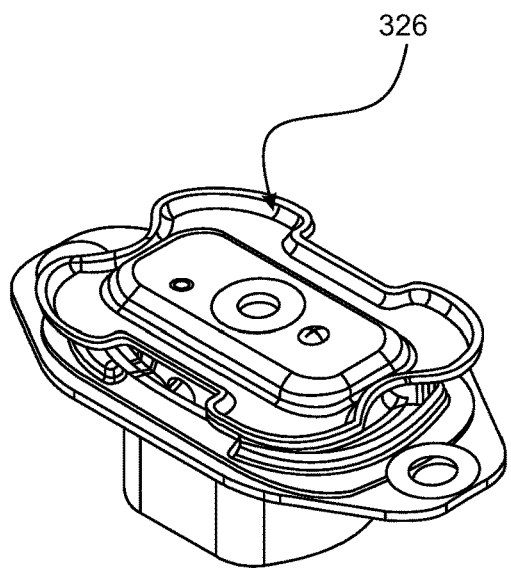
FIG. 7C shows the left isolating element of FIG. 3.

FIG. 7A shows the left chassis-side bracket 322, FIG. 7B shows the left powertrain-side bracket 324 and FIG. 7C shows the left isolating element 326. The left-side powertrain mounting assembly 320 is obtained by assembling the left chassis-side bracket 322, the left powertrain-side bracket 324 and the left isolating element 326.

FIGS. 8A-8E illustrate the steps of assembling the left-side powertrain mounting assembly 320. FIG. 8A shows the left powertrain-side bracket 324 secured on the powertrain 100 by means of seventh fasteners 400 g. Also, the left isolating element 326 is secured on the left powertrain-side bracket 324 by means of fourth fasteners 400 d. FIG. 8B shows the powertrain 100 lowered on the chassis 200, wherein the partially completed left-side powertrain mounting assembly 320 of FIG. 8A is located at the predetermined location on the left-hand side long member 210 a. FIG. 8C shows the right chassis-side bracket 322 fixed on the second suspension-supporting column 220 b. FIG. 8D shows the completed left-side powertrain mounting assembly 320, wherein the left chassis-side bracket 322 is secured to the left-hand side suspension-supporting column 220 b by means of further fasteners 400 h. FIG. 8E shows the completed left-side powertrain mounting assembly 320, showing a first left chassis-side bracket 322 a and a second left chassis-side bracket 322 b.

Figure 9A:
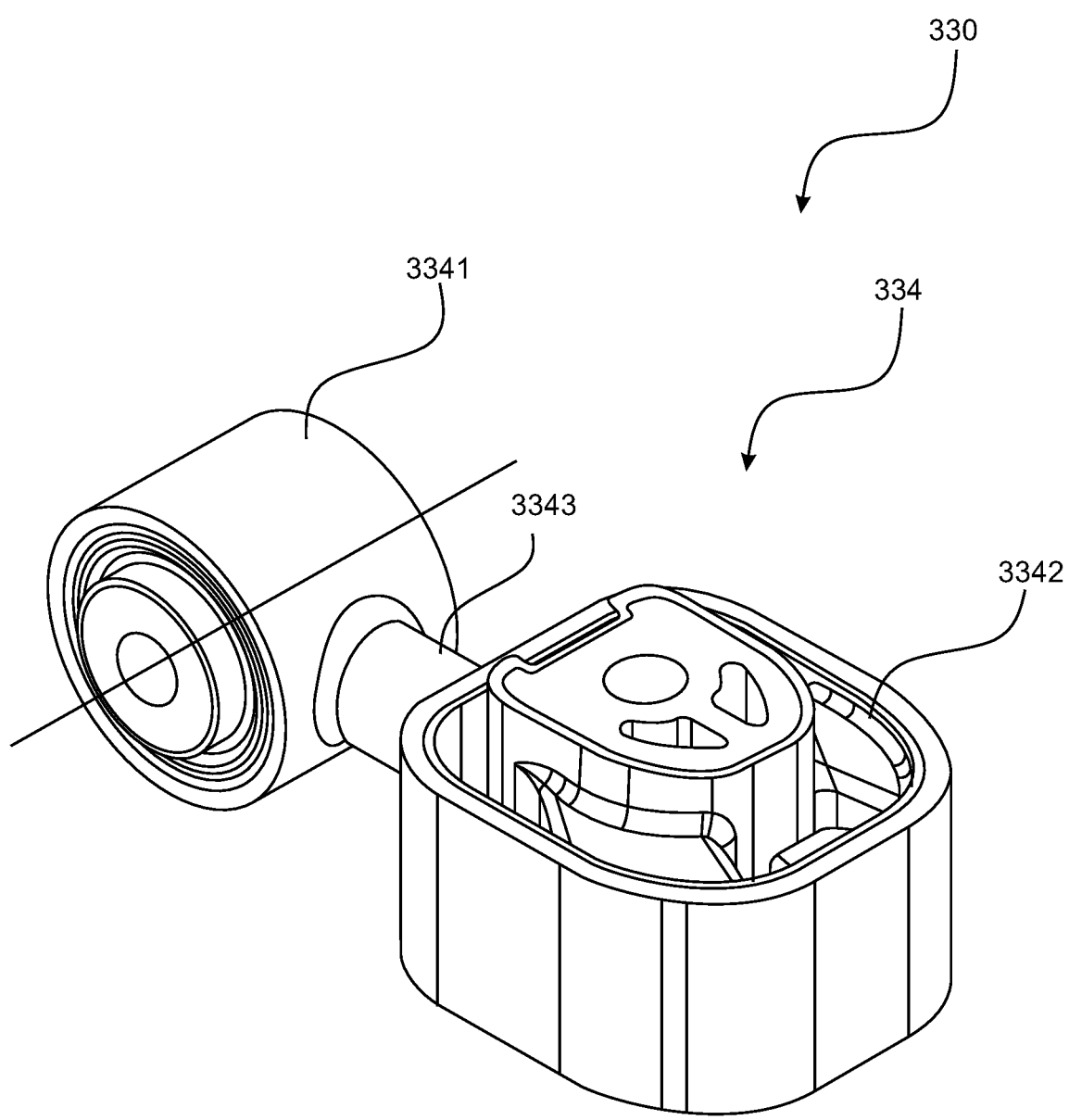
FIG. 9A shows the roll restricting and isolating element of FIG. 4.
Figure 9B:
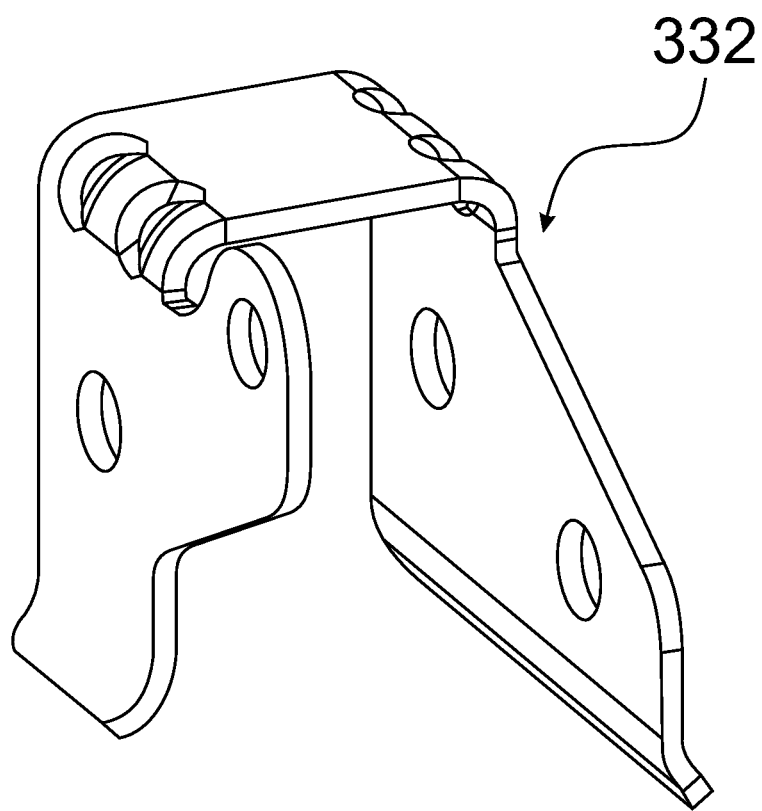
FIG. 9B shows the rear powertrain-side bracket of FIG. 4.

FIG. 9A shows the roll restricting and isolating element 334 and FIG. 9B shows the rear powertrain-side bracket 332. Details of the roll restricting and isolating element 334, i.e., the bushing 3341, the third resilient element 3342 and the link rod 3343 are illustrated in FIG. 9A. The powertrain roll-restricting and mounting assembly 330 is obtained by assembling the rear powertrain-side bracket 332, the roll restricting and isolating element 334, i.e., the bushing 3341, the third resilient element 3342 and the link rod 3343.

Figure 10C:
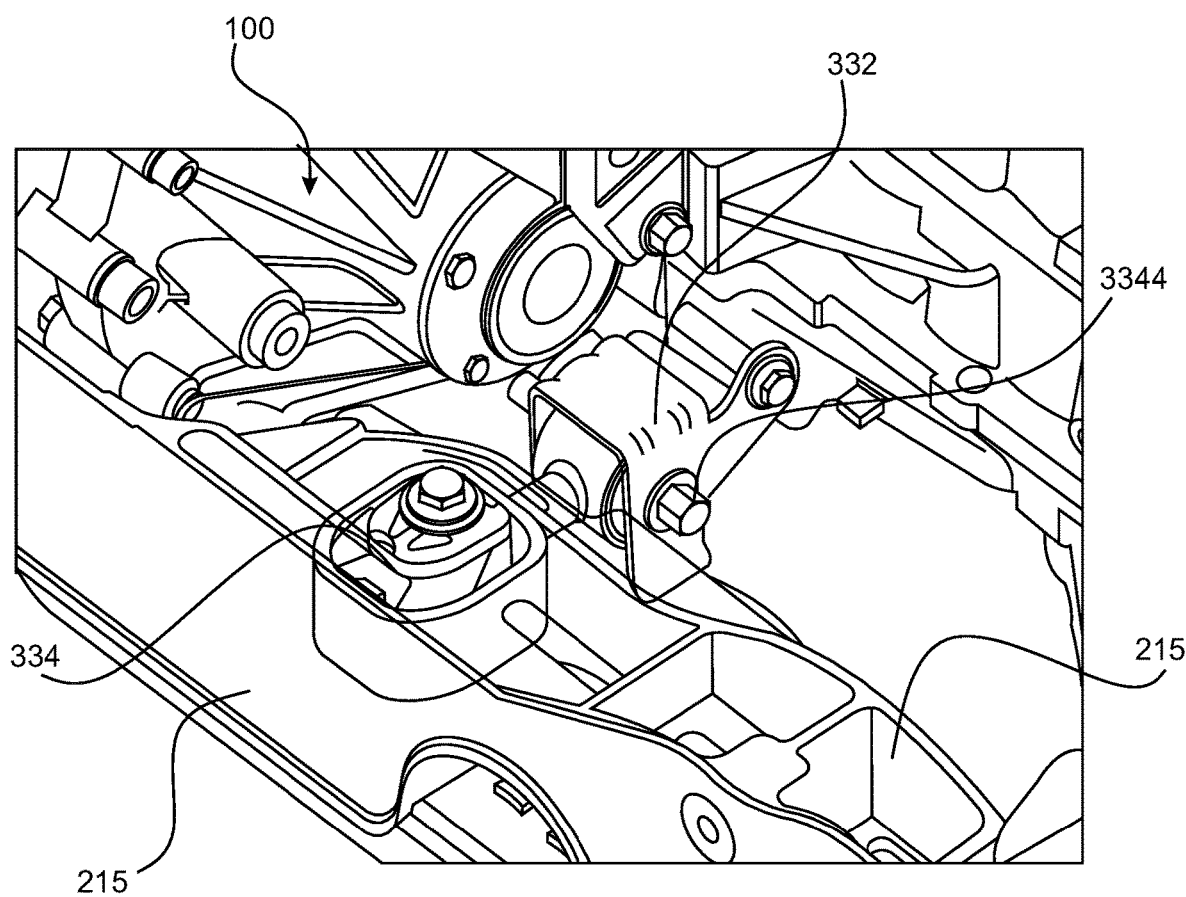
FIG. 10C represent the steps of assembling of the lower rear mount assembly formed by the components of FIGS. 9A, 9B.

FIGS. 10A-10D illustrate the steps of assembling the right-side powertrain mounting assembly 310. FIG. 10A shows the rear powertrain-side bracket 334 secured on the powertrain 100 by means of ninth fasteners 400i. The roll restricting and isolating element 332 is secured to the rear powertrain-side bracket 334 using the fifth fasteners 338. FIG. 10B shows the powertrain 100 supported on the cross member 215 through the powertrain roll-restricting and mounting assembly 330. A tenth fastener 400 j secures the roll restricting and isolating element 334 with the cross member 215. FIG. 10C shows another isometric view of the powertrain 100 supported on the cross member 215 through the powertrain roll-restricting and mounting assembly 330.

In the arrangement for mounting the powertrain of the present disclosure, uniquely, the right chassis-side brackets 312 a, 312 b are welded to the chassis 200 and the left chassis-side bracket 322 is fixed to the chassis 200 using threaded fasteners. The provision of securing the left chassis-side bracket 322 to the left-hand side suspension-supporting column 220 b by means of further fasteners 400 h is made to allow decking of the powertrain 100 on the chassis 200 from top. Once the powertrain 100 is lowered and decked on the chassis 200, the left chassis-side bracket 322 can be secured thereafter to the left-hand side suspension-supporting column 220 b and to the left isolating element 326. As a result, arrangement for mounting the powertrain allows use of the existing assembly line and set of equipment that is in use for a longitudinal mounting configuration of the powertrain on the chassis of a vehicle having a body-on-frame configuration.

The foregoing description of the embodiments has been provided for purposes of illustration and not intended to limit the scope of the present disclosure. Individual components of a particular embodiment are generally not limited to that particular embodiment, but, are interchangeable. Such variations are not to be regarded as a departure from the present disclosure, and all such modifications are considered to be within the scope of the present disclosure.

TECHNICAL ADVANCEMENTS

The present disclosure described herein above has several technical advantages including, but not limited to, the realization of an arrangement for mounting a powertrain of a four-wheeled vehicle, that:

allows use of the existing assembly line and set of equipment that is in use for a longitudinal mounting configuration of the powertrain on the chassis of a vehicle having a body-on-frame configuration;

enables mounting of the powertrain in a transversely aligned configuration on the chassis of a body-on-frame-type vehicle;

provides ease of assembly and assembly personnel safety and comfort;

has optimal weight and volume; and a good vibration-absorbing capacity.

The embodiments herein and the various features and advantageous details thereof are explained with reference to the non-limiting embodiments in the following description. Descriptions of well-known components and processing techniques are omitted so as to not unnecessarily obscure the embodiments herein.

The foregoing description of the specific embodiments so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

The use of the expression "at least" or "at least one" suggests the use of one or more elements or ingredients or quantities, as the use may be in the embodiment of the disclosure to achieve one or more of the desired objects or results.

While considerable emphasis has been placed herein on the components and component parts of the preferred embodiments, it will be appreciated that many embodiments can be made and that many changes can be made in the preferred embodiments without departing from the principles of the disclosure. These and other changes in the preferred embodiment as well as other embodiments of the disclosure will be apparent to those skilled in the art from the disclosure herein, whereby it is to be distinctly understood that the foregoing descriptive matter is to be interpreted merely as illustrative of the disclosure and not as a limitation.

The invention claimed is:

1. An arrangement for mounting a powertrain of a four-wheeled vehicle, the powertrain mounted on a chassis in an orientation transverse to a longitudinal axis of the vehicle defined by the chassis, said arrangement comprising:
   i. a right-side powertrain mounting assembly for supporting the powertrain on a right-hand side with respect to an operative front of the vehicle, said right-side powertrain mounting assembly comprising:

a. at least one right chassis-side bracket configured to be fixed on a right-hand side long member of the chassis;
b. a right powertrain-side bracket configured to be fixed on a predetermined location on an operative right-side of the powertrain;
c. a right isolating element configured to be fitted between said right chassis-side bracket and said right powertrain-side bracket;
d. at least a first fastener to secure said right chassis-side bracket and said right isolating element with respect to each other; and
e. at least a second fastener to secure said right isolating element and said right powertrain-side bracket with respect to each other;

ii. a left-side powertrain mounting assembly for supporting the powertrain on a left-hand side with respect to the operative front of the vehicle, said left-side powertrain mounting assembly comprising:
a. at least one left chassis-side bracket configured to be fixed on the chassis;
b. a left powertrain-side bracket configured to be fixed on a predetermined location on an operative left-side of the powertrain;
c. a left isolating element configured to be fitted between said left chassis-side bracket and said left powertrain-side bracket;
d. at least a third fastener to secure said left chassis-side bracket and said left isolating element with respect to each other; and
e. at least a fourth fastener to secure said left isolating element and said left powertrain-side bracket with respect to each other;

iii. a powertrain roll-restricting and mounting assembly for supporting the powertrain on a rear bottom side of the powertrain, said powertrain roll-restricting and mounting assembly comprising:
a. a rear powertrain-side bracket configured to be fixed on a predetermined location on an operative rear-side of the powertrain;
b. a roll restricting and isolating element configured to attach said rear powertrain-side bracket at a predetermined location on a cross member of the chassis; and
c. at least a fifth fastener configured to secure a third chassis-side bracket and said roll restricting and isolating element with respect to each other;

wherein:
said left-side powertrain mounting assembly comprises two left chassis-side brackets that include a first left chassis-side bracket and a second left chassis-side bracket, wherein said first left chassis-side bracket is configured to be welded to the chassis and said second left chassis-side bracket is configured to be fastened to the chassis using a further fastener, and said left powertrain-side bracket is configured to be located below said left chassis-side bracket.

2. The arrangement as claimed in claim 1, wherein said right-side powertrain mounting assembly and left-side powertrain mounting assembly are configured to be located on a torque roll axis of the powertrain.

3. The arrangement as claimed in claim 2, wherein said powertrain roll-restricting and mounting assembly is configured to be located below said torque roll axis of the powertrain.

4. The arrangement as claimed in claim 1, wherein said right powertrain-side bracket is configured to be located above said right chassis-side bracket.

5. The arrangement as claimed in claim 1, wherein said right powertrain-side bracket is configured to be fixed on an engine portion and said left powertrain-side bracket is configured to be fixed on a transaxle portion of the powertrain.

6. The arrangement as claimed in claim 1, wherein said right isolating element comprises a first outer rigid element and a first inner rigid element and a first resilient element sandwiched between said first outer rigid element and said first inner rigid element.

7. The arrangement as claimed in claim 6, wherein said left isolating element comprises a second outer rigid element and a second inner rigid element and a second resilient element sandwiched between said second outer rigid element and said second inner rigid element.

8. The arrangement as claimed in claim 7, wherein said roll restricting and isolating element comprises a bushing, a third resilient element and a link rod disposed between said bushing and said third resilient element, said bushing configured to be coupled to said rear powertrain-side bracket, said third resilient element adapted to be coupled to said cross member.

9. The arrangement as claimed in claim 1, wherein said first, second, third, fourth and fifth fasteners are bolts.

10. The arrangement as claimed in claim 1, wherein right chassis-side bracket is configured to be fitted adjacent to a right-hand side suspension-supporting column by means of welding, the right-hand side suspension-supporting column being provided on the right-hand side long member of the chassis.

11. The arrangement as claimed in claim 1, wherein left chassis-side bracket is configured to fit on a left-hand side suspension-supporting column by means of said further fastener, the left-hand side suspension-supporting column being provided on a left-hand side long member of the chassis.

12. The arrangement as claimed in claim 1, wherein said right-side powertrain mounting assembly comprises two right chassis-side brackets.

13. The arrangement as claimed in claim 1, wherein said vehicle is a front wheel drive vehicle.

14. The arrangement as claimed in claim 1, wherein said right-side powertrain mounting assembly is closer to an operative front end of the vehicle than said left-side powertrain mounting assembly.

15. A method of mounting a powertrain on a chassis of a vehicle with an arrangement as claimed in claim 1, said method comprising the steps of:
i. pre-assembling said right powertrain-side bracket, said left powertrain-side bracket and said rear powertrain-side bracket and said roll restricting and isolating element on the powertrain;
ii. fixing said right chassis-side bracket to the chassis;
iii. fixing said first left chassis-side bracket to the chassis;
iv. fixing said right isolating element to said right chassis-side bracket;
v. decking an engine from above while aligning said right powertrain-side bracket with said right isolating element to complete said right-side powertrain mounting assembly;
vi. fixing said right powertrain-side bracket with said right isolating element;

vii. fixing said roll restricting and isolating element to a cross member to complete said powertrain roll-restricting and mounting assembly;

viii. fixing said second left chassis-side bracket to at least one of said first left chassis-side bracket and to the chassis; and ix. fixing said left isolating element to said second left chassis-side bracket to complete said left-side powertrain mounting assembly.

16. The method as claimed in claim 15, wherein said step of fixing said right chassis-side bracket to the chassis involves welding said right chassis-side bracket to the chassis.

17. The method as claimed in claim 15, wherein said step of fixing said second left chassis-side bracket to at least one of said first left chassis-side bracket and the chassis involves fastening said second left chassis-side bracket to said first left chassis-side bracket and to the chassis using threaded fasteners.

\* \* \* \* \*